(12) United States Patent
Soulard et al.

(10) Patent No.: US 8,959,309 B2
(45) Date of Patent: Feb. 17, 2015

(54) SKIP LIST GENERATION

(75) Inventors: Hervé Soulard, Beacon Hills (AU);
Alexander Zaphob Barnes, Semaphore (AU); David Karlov, Emu Plains (AU)

(73) Assignee: Canon Kabushiki Kaisha, Tokyo (JP)

( * ) Notice: Subject to any disclaimer, the term of this patent is extended or adjusted under 35 U.S.C. 154(b) by 367 days.

(21) Appl. No.: 13/289,975

(22) Filed: Nov. 4, 2011

(65) Prior Publication Data

US 2012/0136871 A1  May 31, 2012

Related U.S. Application Data

(63) Continuation-in-part of application No. 12/795,556, filed on Jun. 7, 2010, now abandoned.

(30) Foreign Application Priority Data

Jun. 18, 2009  (AU) ................................ 2009-202442
Aug. 10, 2011  (AU) ................................ 2011-211360

(51) Int. Cl.
| | | |
|---|---|---|
| G06F 12/00 | (2006.01) | |
| G06F 11/36 | (2006.01) | |
| G06F 9/45 | (2006.01) | |
| G06F 9/38 | (2006.01) | |
| G06F 9/445 | (2006.01) | |
| G06F 9/44 | (2006.01) | |

(52) U.S. Cl.
CPC *G06F 11/36* (2013.01); *G06F 8/41* (2013.01); *G06F 9/38* (2013.01); *G06F 9/445* (2013.01); *G06F 12/00* (2013.01); *G06F 8/31* (2013.01)
USPC .......................................... 711/170; 707/800

(58) Field of Classification Search
USPC .................... 711/154, 170; 707/800
See application file for complete search history.

(56) References Cited

U.S. PATENT DOCUMENTS

| | | | |
|---|---|---|---|
| 5,659,739 A | 8/1997 | Lubbers et al. | |
| 7,831,624 B2* | 11/2010 | Lubbers et al. | ............... 707/796 |
| 2002/0118682 A1* | 8/2002 | Choe | ....................... 370/395.31 |
| 2004/0107346 A1* | 6/2004 | Goodrich et al. | ............. 713/176 |
| 2009/0006740 A1 | 1/2009 | Lubbers et al. | |

OTHER PUBLICATIONS

Sahni et al., "Weight-Biased Leftist Trees and Modified Skip Lists", University of Florida, 1998, ISSN:1054-6654.
Australian Examiner's First Report dated May 10, 2011 in corresponding Australian Application No. 2009202442.
Australian Search Information Statement dated May 9, 2011 in corresponding Australian Application No. 2009202442.
Maruvada, S.C. et al., "Deterministic Skip Lists in Analog Topological Placement", The 6th International Conference on ASIC 2005 (ASICON 2005), Oct. 2005.
Pugh, W., "Skip Lists: A Probabilistic Alternative to Balanced Trees", Communication of the ACM, vol. 33, No. 6, 1990, p. 668-676.
Papadakis, T., "Skip Lists and Probabilistic Analysis of Algorithms", PhD Thesis, University of Waterloo, 1993.

* cited by examiner

*Primary Examiner* — Kaplit Parikh
(74) *Attorney, Agent, or Firm* — Fitzpatrick, Cella, Harper & Scinto

(57) ABSTRACT

A method of generating a skip list is disclosed. The skip list comprises a data structure for referencing a plurality of ordered nodes, the data structure having a plurality of linked lists, a total number of the plurality of linked lists being constrained by an available memory of a memory system, the method comprising the steps of: inserting a first node of the plurality of nodes into a predetermined linked list of the plurality of linked lists of the data structure of the skip list in the available memory; promoting the first node to one or more other linked lists based on a first set of criteria; and generating the skip list by inserting at least a second node of the plurality of nodes into the data structure and promoting the second node based on a second set of criteria, said second set of criteria being different from the first set of criteria.

16 Claims, 18 Drawing Sheets

SKIP LIST GENERATION

REFERENCE TO RELATED PATENT APPLICATION

This application is a continuation-in-part of U.S. patent application Ser. No. 12/795,556 filed Jun. 7, 2010, which in turn claimed the benefit under 35 U.S.C. §119 of the filing date of Australian Patent Application No. 2009202442, filed Jun. 18, 2009. This application also claims the benefit under 35 U.S.C. §119 of the filing date of Australian Patent Application No. 2011211360 filed Aug. 10, 2011. Each of these documents is hereby incorporated by reference in its entirety as if fully set forth herein.

TECHNICAL FIELD

The current invention relates to the storage of data on a computer system and in particular to generation of skip lists employed in free lists for memory allocation and management.

BACKGROUND

A skip list is a probabilistic data structure used for referencing an ordered list of stored elements and includes nodes that correspond to the respective elements. The purpose of a skip list is to reference the respective elements in a manner that enables a user to quickly locate a particular element. A skip list 200 is shown in FIG. 2A, which contains a number of skip list levels 202. Each level is an ordered linked list of nodes 204 containing a subsequence of the nodes in the linked list of the level below. The bottom level (Level 0) contains all the nodes in the skip list, namely 1, 3, 5, 7, 12, 13, 17, 20 and 21. The decision of whether a node 204 of any given level appears also in the level above this level, is usually made on the basis of a fixed probability. Commonly used values for this probability are 0.25 and 0.5, but any probability can be used. The probability used affects the performance of the skip list.

A search for a node within the skip list starts from the top left corner 206 and moves in the direction of the bottom right corner 208 of the skip list 200. The search is effected by comparing the element that the user is searching for with the nodes of the highest level. In the case of skip list 200, the highest level is level 2. If, for example, a user is trying to locate the element 20, the user firstly compares 20 with the node 7 on level 2, which is the closest to the top left corner 206 of skip list 200. Since 20 is larger than 7, the search continues and 20 is next compared with the second node on level 2, which is of the value of 17. Since the node 17 is also the last one on the level 2 and the element 20 is still larger than this node, the search moves to the lower level 1 and to the right of the node 17. Here the next node is the node 20, which is identical with the element 20. Accordingly, the element 20 is located and the search is terminated. The multi-level structure of the skip list 200 allows more efficient searching to be effected than with the case of simply comparing the element with every single node.

A skip list with a finite number of levels only works efficiently with a limited number of nodes. Once the skip list contains a certain number of nodes, then adding further nodes degrades the performance of the skip list and logarithmic asymptotic complexity, typical for most skip lists, is not maintained. This is a well known limitation of skip lists. This problem also affects deterministic skip lists, in which the decision to promote a node to a higher level is based not on a probability, but on a specific rule.

A common solution to this problem is to increase the number of levels in the skip list. This may not be possible for some skip lists since the increased size of some of the nodes results in an unacceptable memory footprint. This is particularly relevant to a dynamic memory manager which often utilises the so called memory "free list". The free lists are usually used for tracking free memory blocks of limited sizes in which, for efficiency reasons, the skip list nodes themselves are often stored. Thus, the total number of levels of the skip list (also referred to as a plurality of linked lists of the skip list) is constrained by an available size of at least one of the memory blocks referenced by the skip list.

A modified skip list has been developed to overcome the problems created by having a finite number of levels. However, the modified skip list results in additional computations required when searching the list.

Another solution, when an upper bound on the number of nodes in the skip list is known in advance, is to choose a probability value suitable to the particular number of nodes. However, in many cases, such the case of a dynamic memory manager, the number of nodes to be stored is not known in advance and is highly variable. In addition, choosing a probability value that supports a large number of nodes will decrease the performance of the skip list in the cases with a lower number of nodes.

It is an object of the present invention to substantially overcome, or at least ameliorate, one or more disadvantages of existing arrangements or to offer a useful alternative.

SUMMARY

According to a first aspect of the present disclosure, there is provided a method of generating a skip list, the skip list comprising a data structure for referencing a plurality of ordered nodes, the data structure having a plurality of linked lists, a total number of the plurality of linked lists being constrained by an available memory of a memory system, the method comprising the steps of: inserting a first node of the plurality of nodes into a predetermined linked list of the plurality of linked lists of the data structure of the skip list in the available memory; promoting the first node to one or more other linked lists based on a first set of criteria; and generating the skip list by inserting at least a second node of the plurality of nodes into the data structure and promoting the second node based on a second set of criteria, said second set of criteria being different from the first set of criteria.

Preferably, the set of criteria comprises either a probability value or one or more deterministic rules, which may be in a form of a set of deterministic skip list rules.

Other aspects of the invention are also disclosed.

BRIEF DESCRIPTION OF THE DRAWINGS

An embodiment of the present invention will now be described, by way of example only, with reference to the accompanying drawings, in which.

DETAILED DESCRIPTION INCLUDING BEST MODE

Modern computer systems rely heavily on dynamic memory allocation to provide memory space where data may be stored during processing. The applications program executed in such computer systems make requests to a dynamic memory allocator for varying sized blocks of memory. The memory blocks are later returned for reuse to the memory allocator when they are no longer required. The dynamic memory allocator typically manages a list of free blocks, from which the memory allocator can satisfy new requests on behalf of the system, and to which blocks which have been released can be returned.

A dynamic memory allocator typically forms a central part of a computer system. The allocator's memory allocation services are used extensively by numerous system components. Moreover, allocation of memory needs to take place efficiently in order to provide the required overall system performance.

It is common for a dynamic memory allocator to use a skip list to manage the free memory blocks. Skip lists are used because they offer logarithmic asymptotic complexity without the need to reorder items, as is the case for a balanced tree. This is to say, the amount of time needed to locate a memory block using a skip list varies not linearly, but logarithmically with the number of memory blocks managed. Adding and removing blocks of memory from the skip list may take up a significant amount of the dynamic memory allocator's execution time.

Described here, with reference to FIGS. 2A to 14, is a method for a dynamic memory allocation system that uses a skip list to manage memory blocks within a memory allocating arrangement.

Figure 1A:
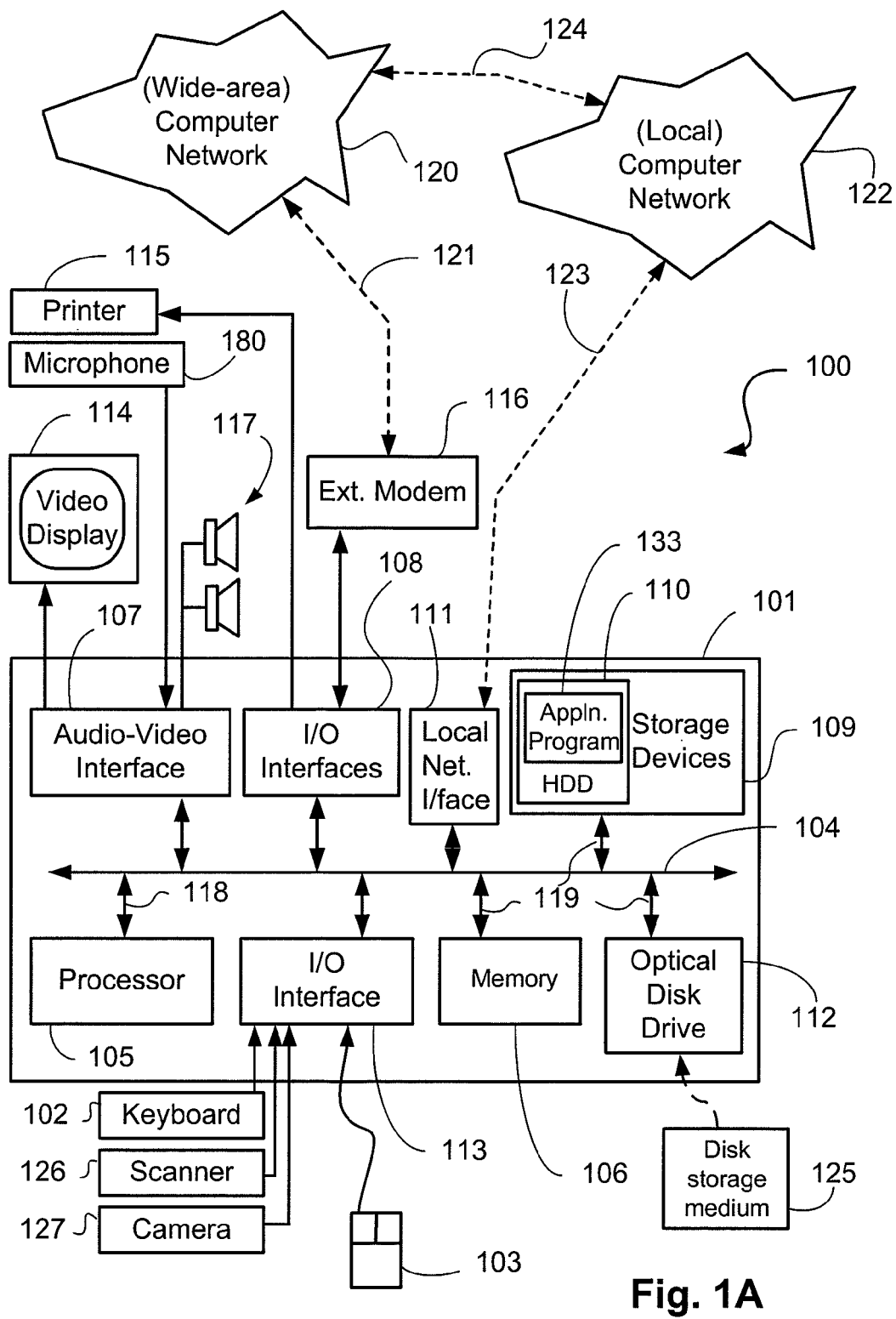
FIGS. 1A and 1B collectively form a schematic block diagram of a general purpose computing system in which the arrangements to be described may be implemented.
Figure 1B:
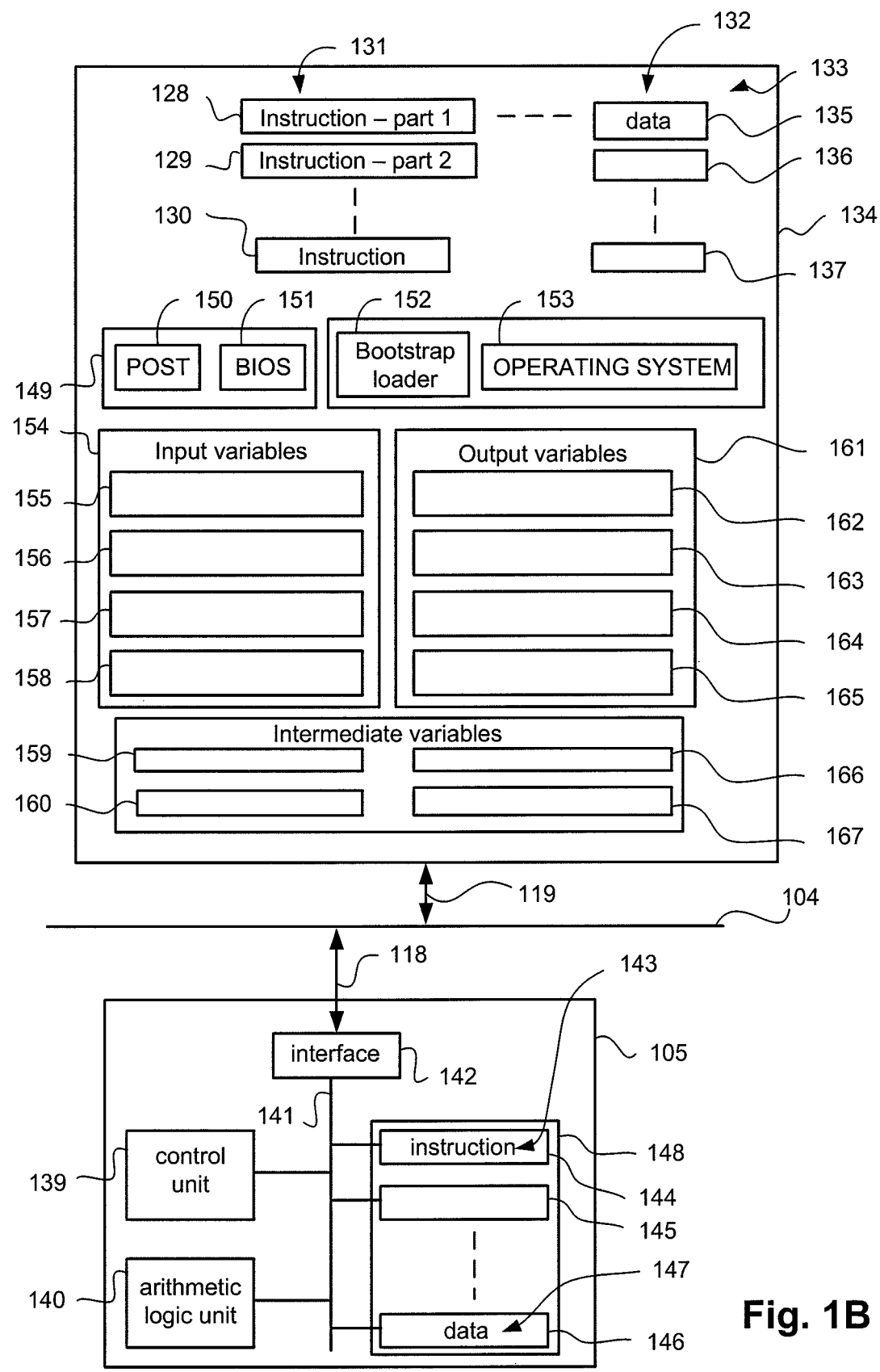

FIGS. 1A and 1B collectively form a schematic block diagram of a general purpose computer system 100, upon which the described methods can be practised.

As seen in FIG. 1A, the computer system 100 is formed by a computer module 101, input devices such as a keyboard 102, a mouse pointer device 103, a scanner 126, a camera 127, and a microphone 180, and output devices including a printer 115, a display device 114 and loudspeakers 117. An external Modulator-Demodulator (Modem) transceiver device 116 may be used by the computer module 101 for communicating to and from a communications network 120 via a connection 121. The network 120 may be a wide-area network (WAN), such as the Internet or a private WAN. Where the connection 121 is a telephone line, the modem 116 may be a traditional "dial-up" modem. Alternatively, where the connection 121 is a high capacity (eg: cable) connection, the modem 116 may be a broadband modem. A wireless modem may also be used for wireless connection to the network 120.

The computer module 101 typically includes at least one processor unit 105, and a memory unit 106, for example formed from semiconductor random access memory (RAM), and semiconductor read only memory (ROM). The module 101 also includes a number of input/output (I/O) interfaces including an audio-video interface 107 that couples to the video display 114, loudspeakers 117 and microphone 180, an I/O interface 113 for the keyboard 102, mouse 103, scanner 126, camera 127 and optionally a joystick (not illustrated), and an interface 108 for the external modem 116 and printer 115. In some implementations, the modem 116 may be incorporated within the computer module 101, for example within the interface 108. The computer module 101 also has a local network interface 111 which, via a connection 123, permits coupling of the computer system 100 to a local computer network 122, known as a Local Area Network (LAN). As also illustrated, the local network 122 may also couple to the wide network 120 via a connection 124, which would typically include a so-called "firewall" device or device of similar functionality. The interface 111 may be formed by an Ethernet™ circuit card, a Bluetooth™ wireless arrangement or an IEEE 802.11 wireless arrangement.

The interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (eg: CD-ROM, DVD), USB-RAM, and floppy disks for example may then be used as appropriate sources of data to the system 100.

The components 105 to 113 of the computer module 101 typically communicate via an interconnected bus 104 and in a manner which results in a conventional mode of operation of the computer system 100 known to those in the relevant art. Examples of computers on which the described arrangements can be practised include IBM-PC's and compatibles, Sun Sparcstations, Apple Mac™ or alike computer systems evolved therefrom.

The disclosed methods for skip list generation and the implementation of the skip list within a free list data structure used for managing free memory blocks, may be implemented using the computer system 100. The specific processes that will be described with reference to FIGS. 7 to 10 and 12 to 14, may be implemented as one or more software application programs 133 executable within the computer system 100. In particular, the steps of managing the free list, implementing the disclosed skip list, are effected by instructions 131 in the software 133 that are carried out within the computer system 100. The software instructions 131 may be formed as one or more code modules, each for performing one or more particular tasks. The software may also be divided into two separate parts, in which a first part and the corresponding code modules manages the free list and a second part and the corresponding code modules manage a user interface between the first part and the user.

The software 133 is generally loaded into the computer system 100 from a computer readable medium, and is then typically stored in the HDD 110, as illustrated in FIG. 1A, or the memory 106, after which the software 133 can be executed by the computer system 100. In some instances, the application programs 133 may be supplied to the user encoded on one or more CD-ROM 125 and read via the corresponding drive 112 prior to storage in the memory 110 or 106. Alternatively the software 133 may be read by the computer system 100 from the networks 120 or 122 or loaded into the computer system 100 from other computer readable media. Computer readable storage media refers to any storage medium that participates in providing instructions and/or data to the computer system 100 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 101. Examples of computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory devices (including the HDD 110 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106. A program permanently stored in a hardware device such as the ROM 149 is sometimes referred to as firmware. The POST program 150 examines hardware within the computer module 101 to ensure proper functioning, and typically checks the processor 105, the memory (109, 106), and a basic input-output systems software (BIOS) module 151, also typically stored in the ROM 149, for correct operation. Once the POST program 150 has run successfully, the BIOS 151 activates the hard disk drive 110. Activation of the hard disk drive 110 causes a bootstrap loader program 152 that is resident on the hard disk drive 110 to execute via the processor 105. This loads an operating system 153 into the RAM memory 106 upon which the operating system 153 commences operation. The operating system 153 is a system level application, executable by the processor 105, to fulfill various high level functions, including processor management, memory management, device management, storage management, software application interface, and generic user interface.

The operating system 153 manages the memory (109, 106) in order to ensure that each process or application running on the computer module 101 has sufficient memory in which to execute without colliding with memory allocated to another process. Furthermore, the different types of memory available in the system 100 must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

The processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal buses 141 functionally interconnect these functional modules. The processor 105 typically also has one or more interfaces 142 for communicating with external devices via the system bus 104, using a connection 118.

The application program 133 includes a sequence of instructions 131 that may include conditional branch and loop instructions. The program 133 may also include data 132 which is used in execution of the program 133. The instructions 131 and the data 132 are stored in memory locations 128-130 and 135-137 respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128-129.

In general, the processor 105 is given a set of instructions which are executed therein. The processor 105 then waits for a subsequent input, to which it reacts to by executing another set of instructions. Each input may be provided from one or more of a number of sources, including data generated by one or more of the input devices 102, 103, data received from an external source across one of the networks 120, 122, data retrieved from one of the storage devices 106, 109 or data retrieved from a storage medium 125 inserted into the corresponding reader 112. The execution of a set of the instructions may in some cases result in output of data. Execution may also involve storing data or variables to the memory 134.

The disclosed methods for generation and management of a skip list, as well as the skip list's implementation within a free list, can use input variables 154 that are stored in the memory 134 in corresponding memory locations 155-158. The free list management methods produce output variables 161 that are stored in the memory 134 in corresponding memory locations 162-165. Intermediate variables may be stored in memory locations 159, 160, 166 and 167.

The free list data structure, implementing the described skip list, will be described with reference to FIGS. 2 to 5. This free list data structure can be used to track blocks of free memory within the memory unit 134 and can, itself, be stored within the memory unit 134.

The register section 144-146, the arithmetic logic unit (ALU) 140, and the control unit 139 of the processor 105 work together to perform sequences of micro-operations needed to perform "fetch, decode, and execute" cycles for every instruction in the instruction set making up the program 133. Each fetch, decode, and execute cycle comprises:

(a) a fetch operation, which fetches or reads an instruction 131 from a memory location 128;

(b) a decode operation in which the control unit 139 determines which instruction has been fetched; and (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 135-137.

Each step or sub-process in the processes of FIGS. 2A-14 is associated with one or more segments of the program 133, and is performed by the register section 144-147, the ALU 140, and the control unit 139 in the processor 105 working together to perform the fetch, decode, and execute cycles for every instruction in the instruction set for the noted segments of the program 133.

The free list management methods may alternatively be implemented in dedicated hardware such as one or more integrated circuits performing the functions or sub functions to be described. Such dedicated hardware may include graphic processors, digital signal processors, or one or more microprocessors and associated memories.

Figure 2A:
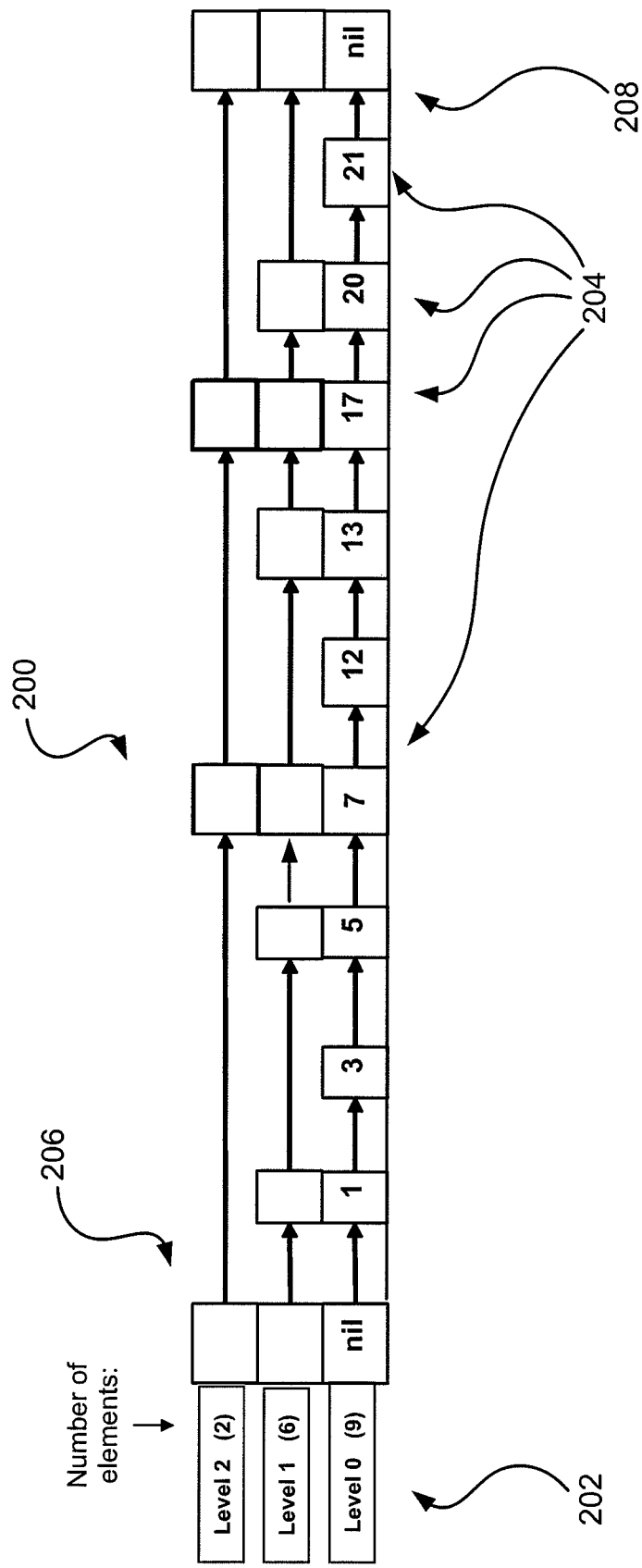
FIG. 2A is a schematic representation of a skip list.
Figure 2B:
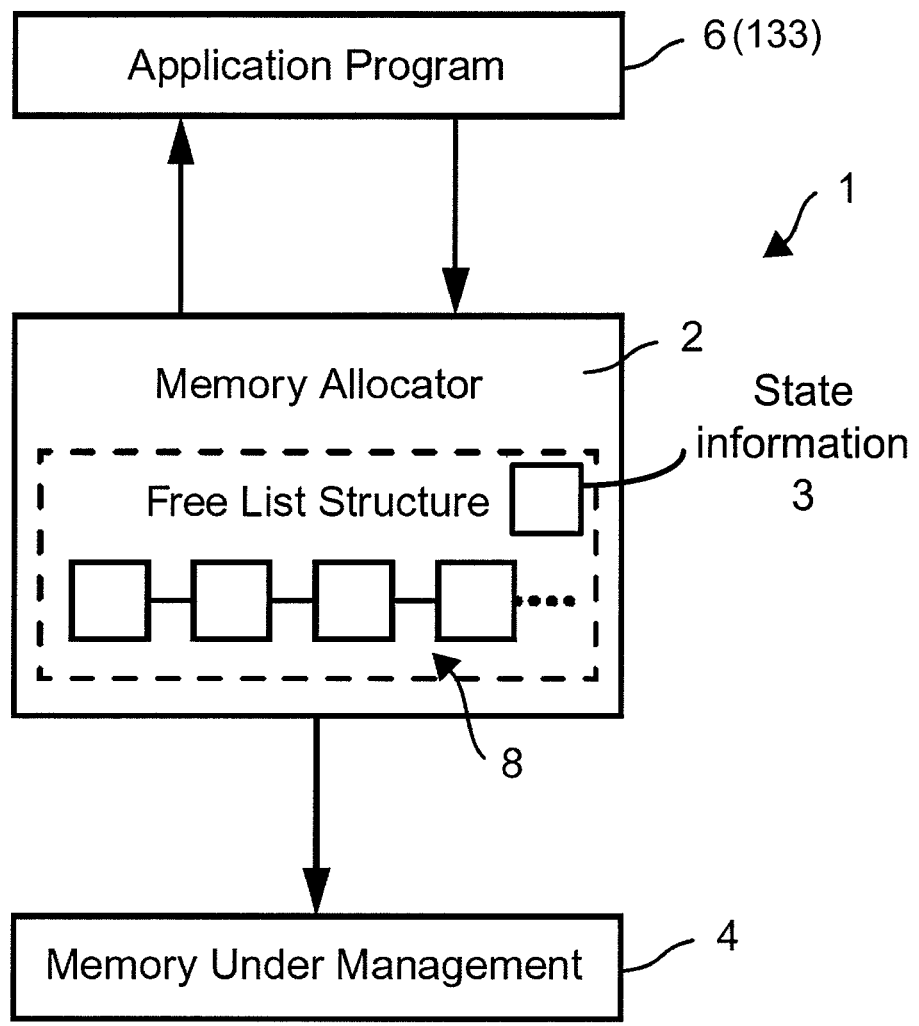
FIG. 2B is a schematic diagram of an application requesting a free memory block via a dynamic memory allocator.

FIG. 2B shows a dynamic memory allocation system 1 including a memory allocator 2, and controlled memory 4. The memory allocator 2 arbitrates requests from an application program 6 for free memory blocks of varying size. The application program 6 is preferably implemented as one of the one or more application programs 133 that are executed by processor 105 on the computer module 101. Accordingly, throughout the following description, the application program 6 will be referred to as the application program 133. The memory allocator 2 is preferably also implemented either as one of the application programs 133, or a part of the one the application programs 133 that are executed by processor 105 on the computer module 101. In the embodiment shown in FIG. 2, the application program 133 is a graphics manipulation program which requires memory for image storage, image buffering, and storage of program modules, for example. However, it will be appreciated that the arrangement described can be implemented in relation to any form of program in which an associative array data structure is used to store data.

To manage some part of the memory 134 being used by the application program 133 or other applications, the memory allocator 2 maintains a linked free-list 8 which stores the addresses and sizes of free memory blocks within the memory 134. The linked free-list 8 is also stored within the memory 134.

The linked free-list 8 is stored using a dual skip-list structure, where each block on the free list 8 is effectively linked into two skip lists 200 (FIG. 2A) at once, each list having a different ordering. One skip list 200 is ordered by block size (the "size-ordered list"), and is used to locate the best fit block quickly in response to an allocation request. The other skip list 200 is ordered by memory address (the "address-ordered" list), and is used to allow neighboring free blocks to be located quickly so that merging can be attempted every time a memory block is freed. The memory allocator 2 also includes free list state information 3 that is updated during the operation of the linked free-list 8. Skip lists 200 are used in the linked free-list 8 because they offer logarithmic asymptotic complexity without the need to reorder items as is the case for a balanced tree, making the allocator faster, simpler and less error-prone than conventional balanced tree based allocators.

Figure 3:
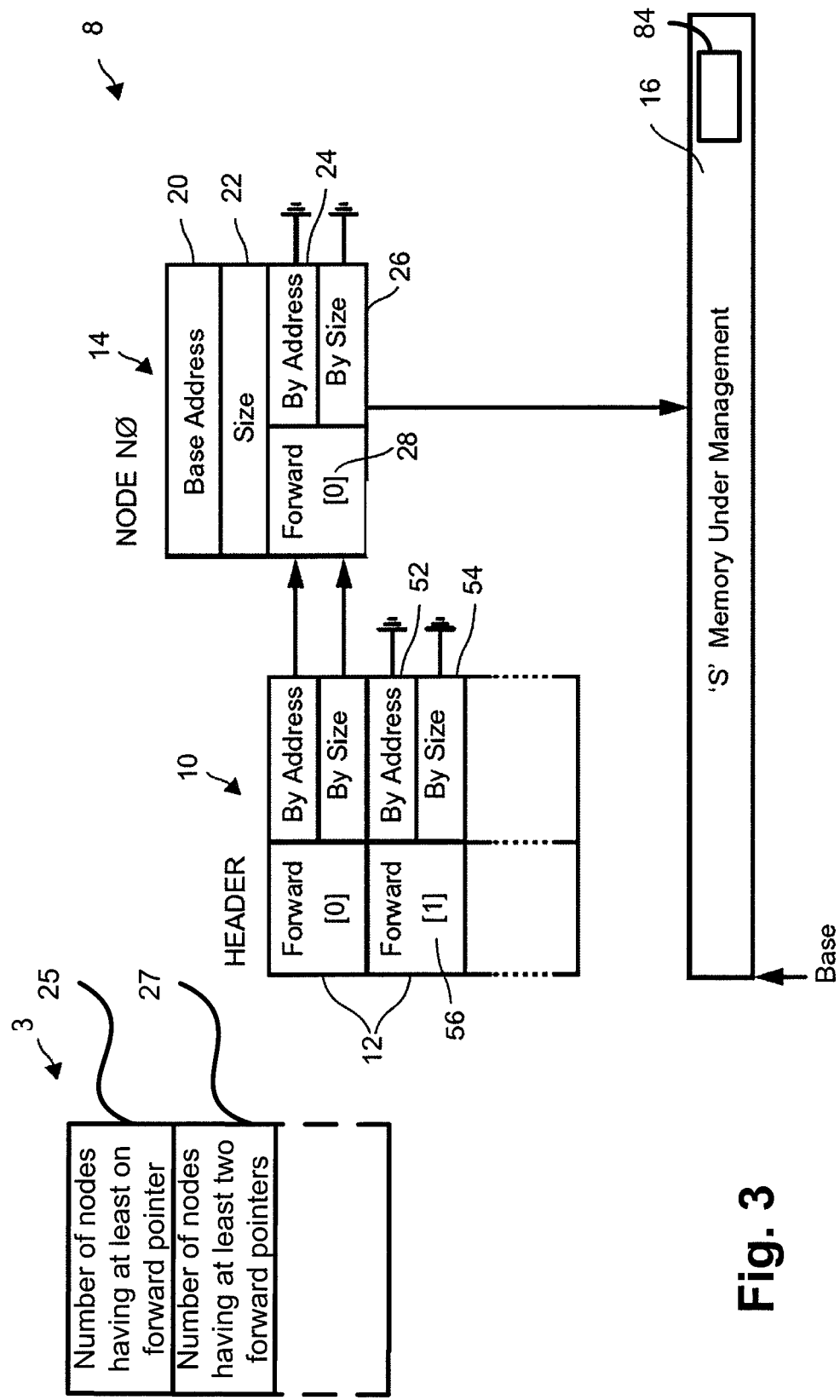
FIG. 3 is a schematic diagram of a memory flee list with a simplified representation of associated memory, prior to any memory allocations being performed.

FIG. 3 shows the initial stricture of the free list 8, when the entire memory with size S is available for allocation as a free memory block 16. The free-list includes a header 10 which defines one or more header elements 12, depending upon the size of the free list. The free-list 8 also includes a node 14. The node 14 references a free memory block 16 and is stored in memory block 84, which is part of, and is located at the end of the free memory 16. The node 14 represents a list entry in each of the size-ordered and address-ordered lists. In particular, the node 14 contains:

an address 20 of the free memory block 16 which the node element 14 represents and references;

a size 22 (typically in bytes) of the free memory block 16; and an array of forward pointer structures, each consisting of a "by address" pointer 24 and a "by size" pointer 26. The size of the array of forward pointer structures is limited by the size of the memory 16 the node is representing since the node is stored in this memory. The number of forward pointer structures in the node minus one is referred to as the level of the node. For example node 14 with one forward pointer structure 28 has a level of zero.

In one implementation, the free list only tracks memory blocks large enough to hold a node with four forward pointer structures 28. The minimum node size is the size large enough to hold four forward pointer structures 28. In one example, a node can have a maximum of eight forward pointer structures 28. The maximum node size is, therefore, the size of a node that has the maximum number of forward pointer structures 28 (that is, eight).

The header elements 12 are not associated with a particular memory block, and are used as an initial starting point for a size-based or an address-based search. Each header element 12 includes an array of forward pointer structures 56, each containing a "by address" pointer 52 and a "by size" pointer 54. In one implementation, the number of forward pointer structures 56 in the header element 12 is equal to 8, which is the maximum number of forward pointer structures 28 in any node 14 in the free-list 8.

At the stage shown in FIG. 3, no memory has been allocated yet by the processor 105, and so there is only a single free list element 14, implementing a skip list node NØ associated with the single free memory block 16. The "by address" pointer 24 and "by size" pointer 26 are mill pointers, as depicted by the "earth" symbol in FIG. 3.

The linked free-list 8 is also associated with the free list state information 3 that is updated during the operation of the linked free-list 8. The state information 3 contains, for each forward pointer structure 56 in the free-list header 10, a count of the number of nodes 14 having a corresponding forward pointer structures 28. In FIG. 3 the number 25 of nodes having at least one forward pointer structure has a value of I because the free-list 8 has one node NØ with a first forward pointer structure 28. Also the number 27 of nodes having at least two forward pointer structures has a value of zero because the free-list 8 has no nodes that have a second forward pointer structure.

Figure 4:
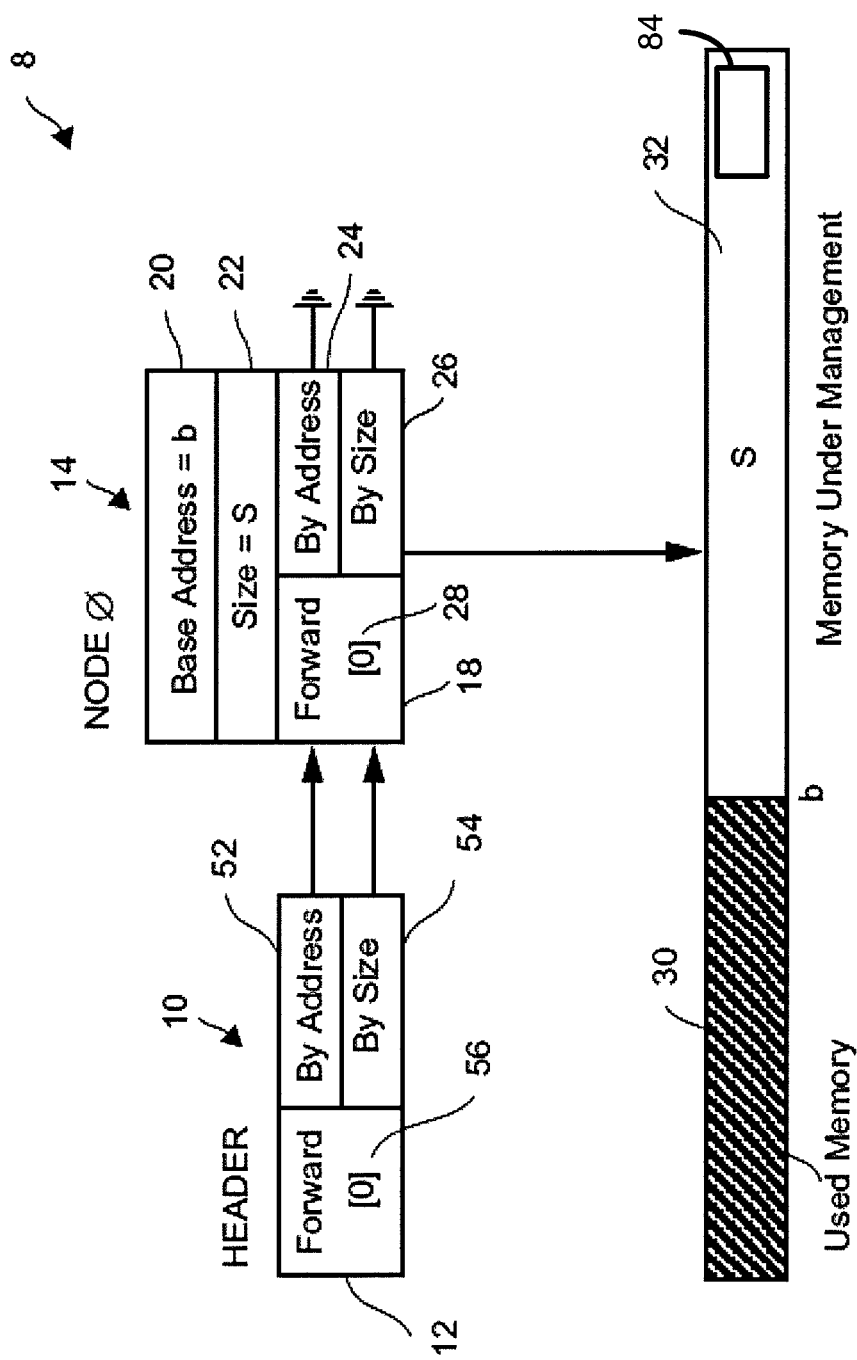
FIG. 4 shows the memory free list and associated memory of FIG. 3, after a single memory allocation has been performed.

Turning to FIG. 4, a single memory allocation 30 has been made by the processor 105, defining a new free memory block 32, having an address b and a size S. The node NØ is updated to reflect the new address and size details and still resides in memory block 84 at the end of the new free memory block.

Figure 5:
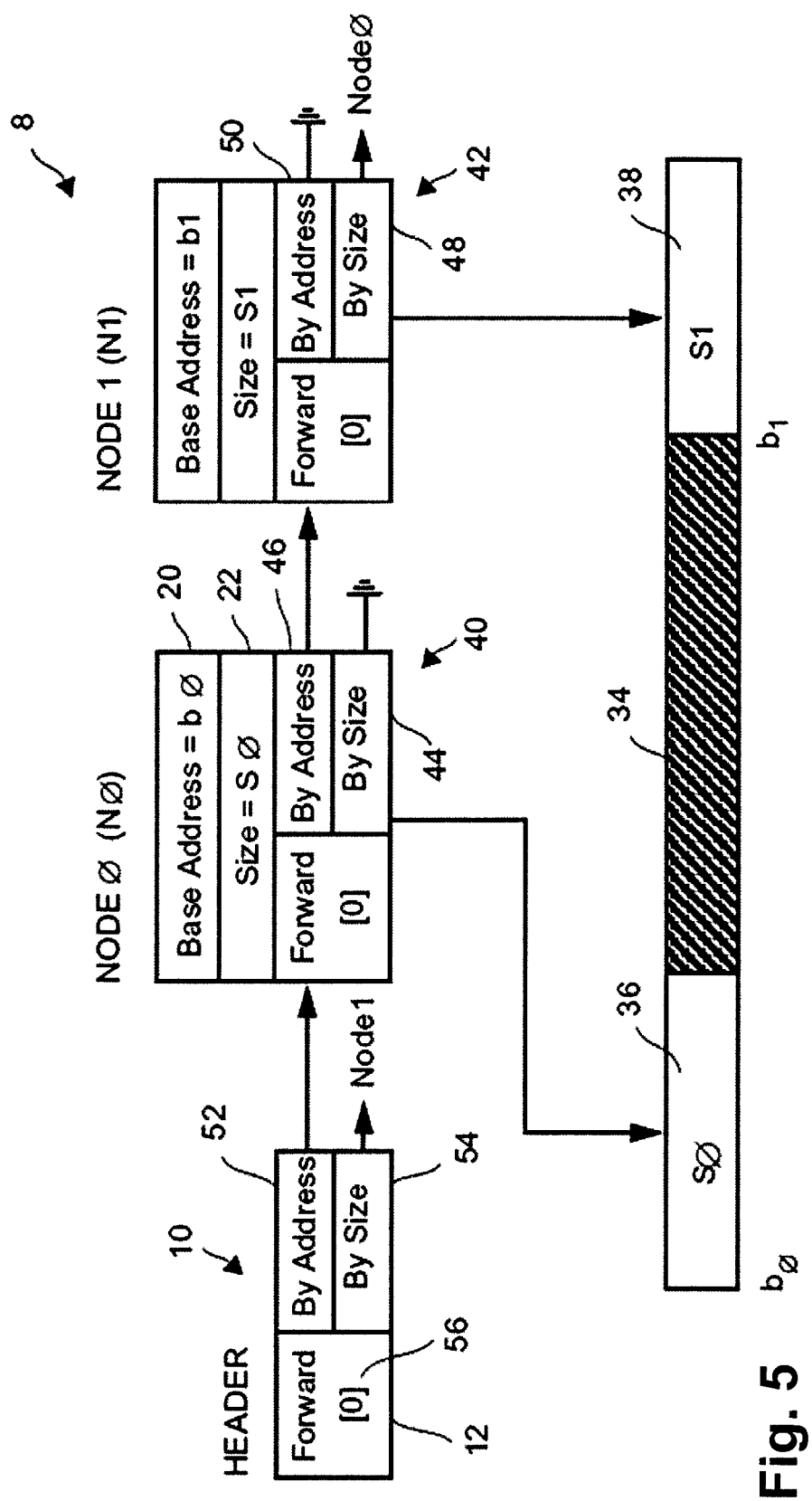
FIG. 5 shows the memory free list and associated memory of FIGS. 3 and 4, with two non-contiguous free memory blocks.

In FIG. 5, the memory block 30 has been released and a memory allocation 34 has been made by the processor 105, leaving two free memory blocks 36 and 38, having addresses b0 and b1, and sizes SØ and S1, respectively. In this example S1 is smaller than SØ. This results in a first node NØ and a second node N1, corresponding to respective free list elements 40 and 42. The first node NØ corresponds to the memory block 36 and the second node N1 corresponds to the memory block 38. Each of these nodes has corresponding base address and size (for node NØ these are labelled with 20 and 22, respectively), as well as a forward element able to direct a node search conducted "by address" (numerals 46 and 50, respectively) and "by size" (44 and 48, respectively). Because of the presence of two nodes only, the header 10 of the respective free list includes only one forward element 12 which is able to direct a search to the respective nodes by way of address (52) and by size (54).

For simplicity, throughout the following text, reference will be made to the skip list nodes and not to the corresponding free list elements. The node NØ contains a "by size" pointer 44 and a "by address" pointer 46, along with the address b0 and size S0 of the associated free memory block 36. Similarly, the node N1 contains a "by size" pointer 48 and a "by address" pointer 50, along with the address b1 and size S1 of the associated free memory block 38.

It will be noted that, in many cases, the "by size" pointers 44 and 48 point to a different element than the "by address" pointers 46 and 50 associated with the respective node elements 40 and 42. This is because the lists with which they are respectively associated are ordered by different keys.

Figure 6A:
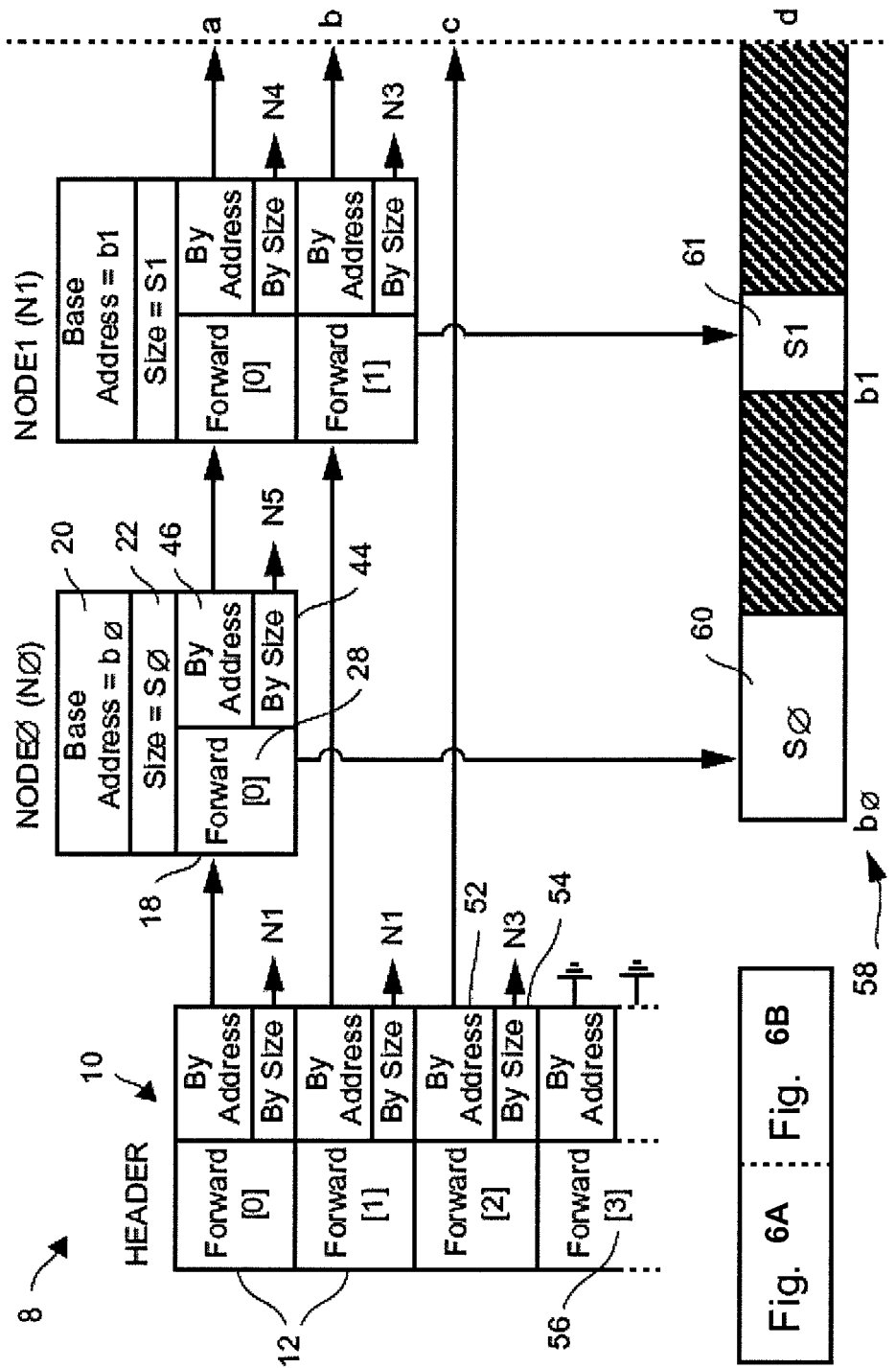
FIGS. 6A and 6B collectively represent the memory free list and associated memory shown in FIGS. 3 to 5, with a plurality of non-contiguous free memory blocks.
Figure 6B:
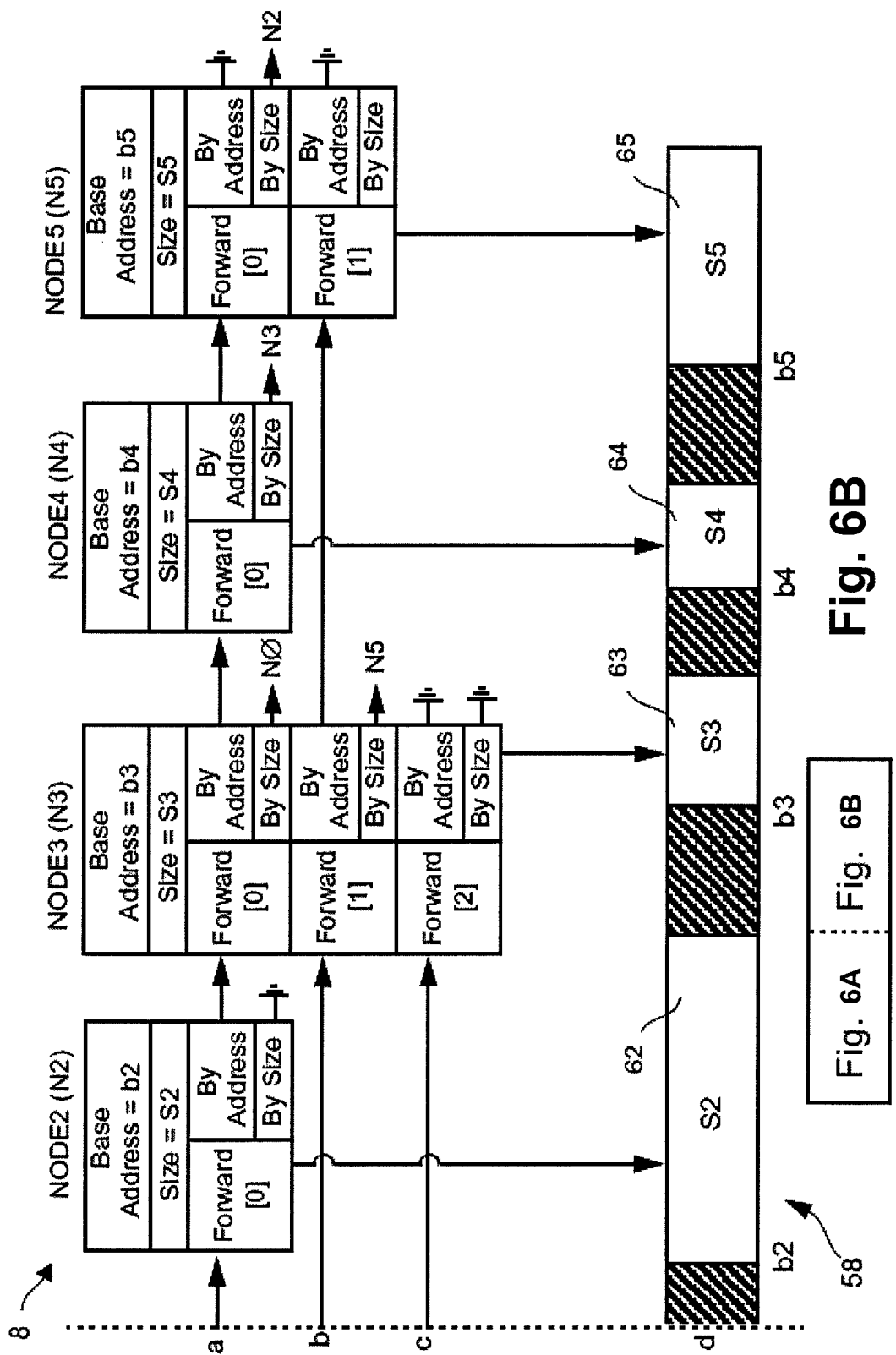

We now turn to FIG. 6, which is shown on two pages and is, thus, composited by two sub-FIGS. 6A and 6B, which combine to represent a multiple entry skip list 58 representing a plurality of free memory blocks 60, 61, 62, 63, 64 and 65 at addresses b0, b1, b2, b3, b4 and b5, and having sizes S0, S1, S2, S3, S4 and S5, respectively. Each of the free memory blocks 60 to 65 has an associated node, designated NØ, N1, N2, N3, N4 and N5 respectively.

The combined FIG. 6 also includes a list of the memory blocks 60 to 65, ordered by size. The particular size order of the memory blocks is as follows; S1 is smaller than S4, which is smaller than S3, which is smaller than SØ, which is smaller than S5, which is smaller than S2. In view of the six nodes (node NØ to node N5) included in this free list, the header 10 of the list includes a number of forward elements 12 which point out to various nodes depending on whether the selection is based on the node address ("forwarding by address" 52) or size ("forwarding by size" 54).

For simplicity and succinctness, the base address (20), the size (22), the forward element (28), as well as the "forwarding by address" (46) and "forwarding by size" (44) have been marked with the respective numerals only for node NØ. As shown in the FIGS. 6A and 6B, the "forwarding by address" of each node points to the respective adjacent nodes located in the direction of interrogation of the skip list (which is from left to right). However, the "by size" forwarding follows different rules. For example, the "by size forwarding of the free list header 10 points towards node N1 (for level 0 and level 1) and node N3 (for level 2). The "by size" forwarding of node 0 points to node N5. The "by size" forwarding of the zero level in node N1 points to node 4, while the same forwarding of level 1 of node N1 points to node N3.

Because the second node 2 is the largest, its "by size" forwarding does not point to any other node. Moving now to node N3, The "by size" forwarding of the level 0 of this node points to node N0, that of level 1 points to node N5 and that of level 2 does not point to any other node. The "by size" forwarding of the zero level of node N4 points to node N3, while that of the "zero" level of node N5 points to N2. The "by size" forwarding of the first level of node 5 does not point to any other node.

The level of each node is determined as part of the release process described with reference to FIG. 8.

The elements in the free-list shown in FIGS. 3, 4, 5 and 6 are organised in two skip list structures, one of which is the size-ordered skip list, the other being the address-ordered skip list.

The specific method used for skip list management is implemented within the context of complementary memory block allocation and release processes which are discussed in the following description.

Allocation Process

Figure 7:
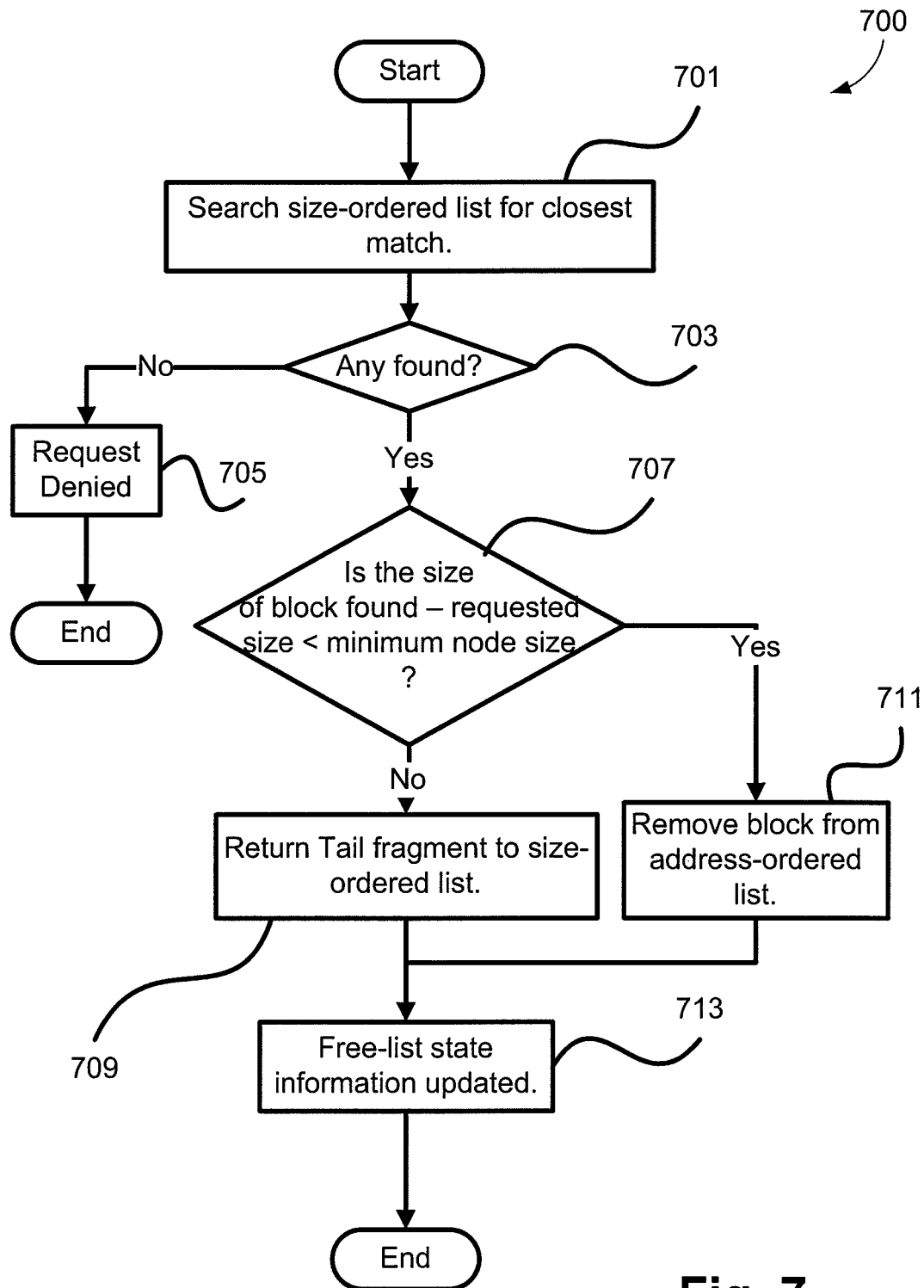
FIG. 7 is a schematic flow diagram showing free memory block allocation process in accordance with one embodiment of the described method.

FIG. 7 is a schematic flow diagram showing the process of allocating free memory blocks, in accordance with an embodiment of the disclosed method. The method 700 may for example, be implemented within the processor 105 of the computer module 101, as part of the operation of the memory allocator 2. The memory allocator 2 may be invoked when, for example the application program 133 requests memory blocks from memory, such as memory 134 to be allocated or released.

The process begins at searching step 701. In this step, when an allocation request is made by the application program 133 for a memory block of a particular size, the size-ordered list is searched by the processor 105 for a block which is equal to or larger, but is also the closest in size to that requested. The search is performed as a standard skip list search that will be well known to those skilled in the art. At the comparison step 703, the processor 105 carries out a check to determine if any blocks have been found. If no blocks have been found, the process proceeds to the next step 705, where the request is denied and the process concludes.

If a block has been found the processor 105 continues the execution of the process 700 to the checking step 707, where the block is checked to see if the size of the block found minus the requested size is smaller than the minimum node size.

If not (no option of step 707) then at returning step 709 the block is split into a head fragment that is an exact size match, and a remainder. The head fragment is not tracked in the free-list any more and is marked for allocation. The remainder of the block constitutes the tail fragment. The node associated with the original block is removed by the processor 105 from the size-ordered list. The node, since it is stored at the end of the original block, already resides at the end of the tail fragment and is updated to represent the size and address of the tail fragment. The processor 105 returns the tail fragment to the size-ordered list in the appropriate place according to the tail fragment's size. It will be appreciated that the tail fragment will simply take the place of the original block on the address-ordered list, since it retains the ordering of the original block with respect to its closest neighbors. The process continues at step 713, in which the processor 105 updates the associated free list state information 3.

Alternatively (yes option of step 707), if the size of the block found minus the requested size is too small to be tracked in the free-list, at removal step 711, the node associated with the block being allocated is removed from the address-ordered skip list and the size-ordered skip list (both skip lists not shown) by the processor 105. The block is marked again for allocation. It will be appreciated that the block marked for allocation may be larger than the request size due to the constraint that the block must be at least as large as the minimum node size. In the subsequent, step 713, the processor 105 updates the free-list state information 3. In particular, in the state information 3, each count of the number of nodes having at least a given number of forward pointer structures, such as 25 and 27, is decremented by one if the node that was removed from the free-list had at least that many forward pointer structures. Also in the updating step 713 the memory is marked for allocation and is returned to the application program 133 by the processor 105. The allocation process terminates.

Release Process

Figure 8:
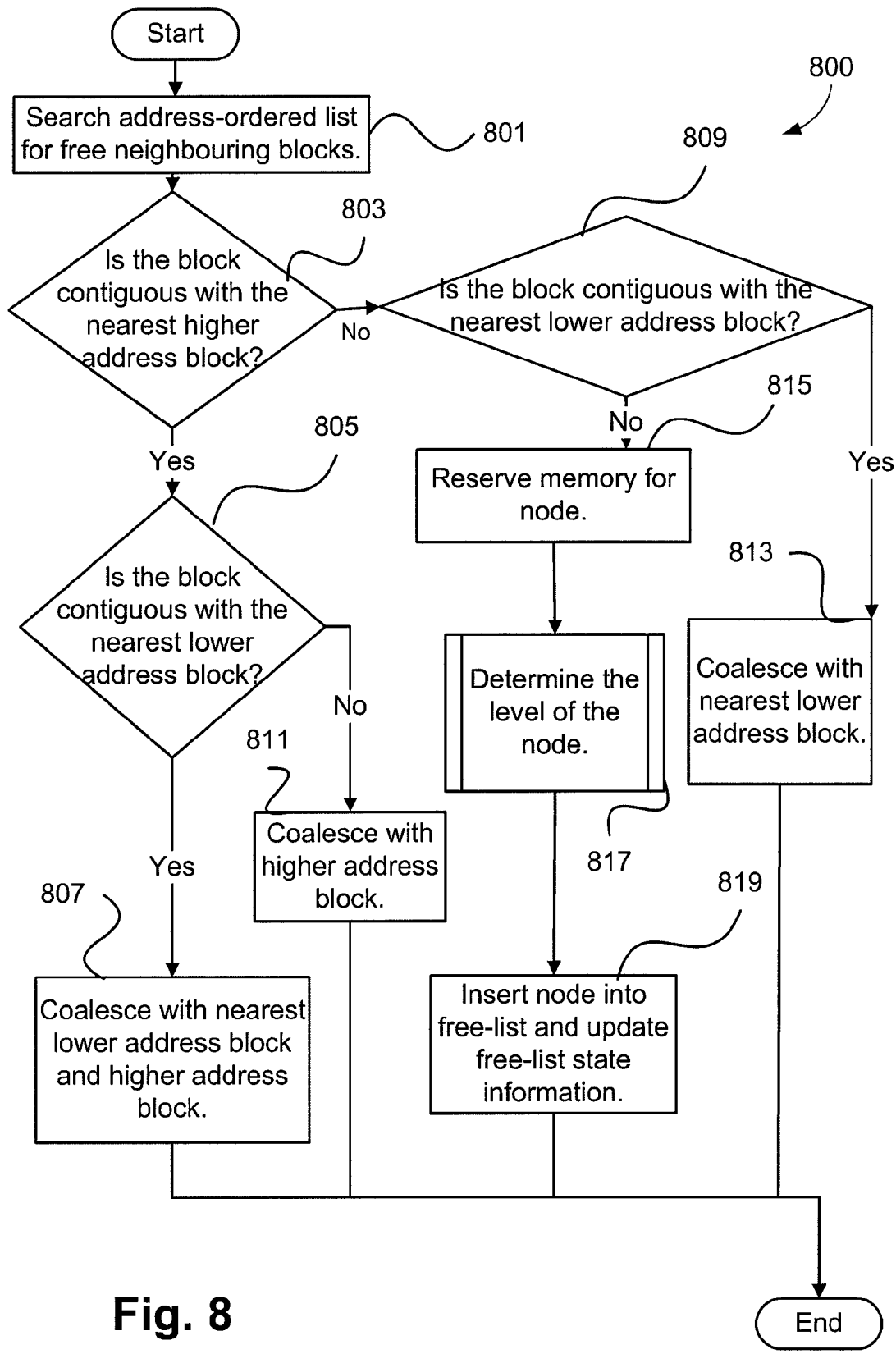
FIG. 8 is a schematic flow diagram showing the process of releasing free memory blocks in accordance with one embodiment of the described method.
Figure 9A:
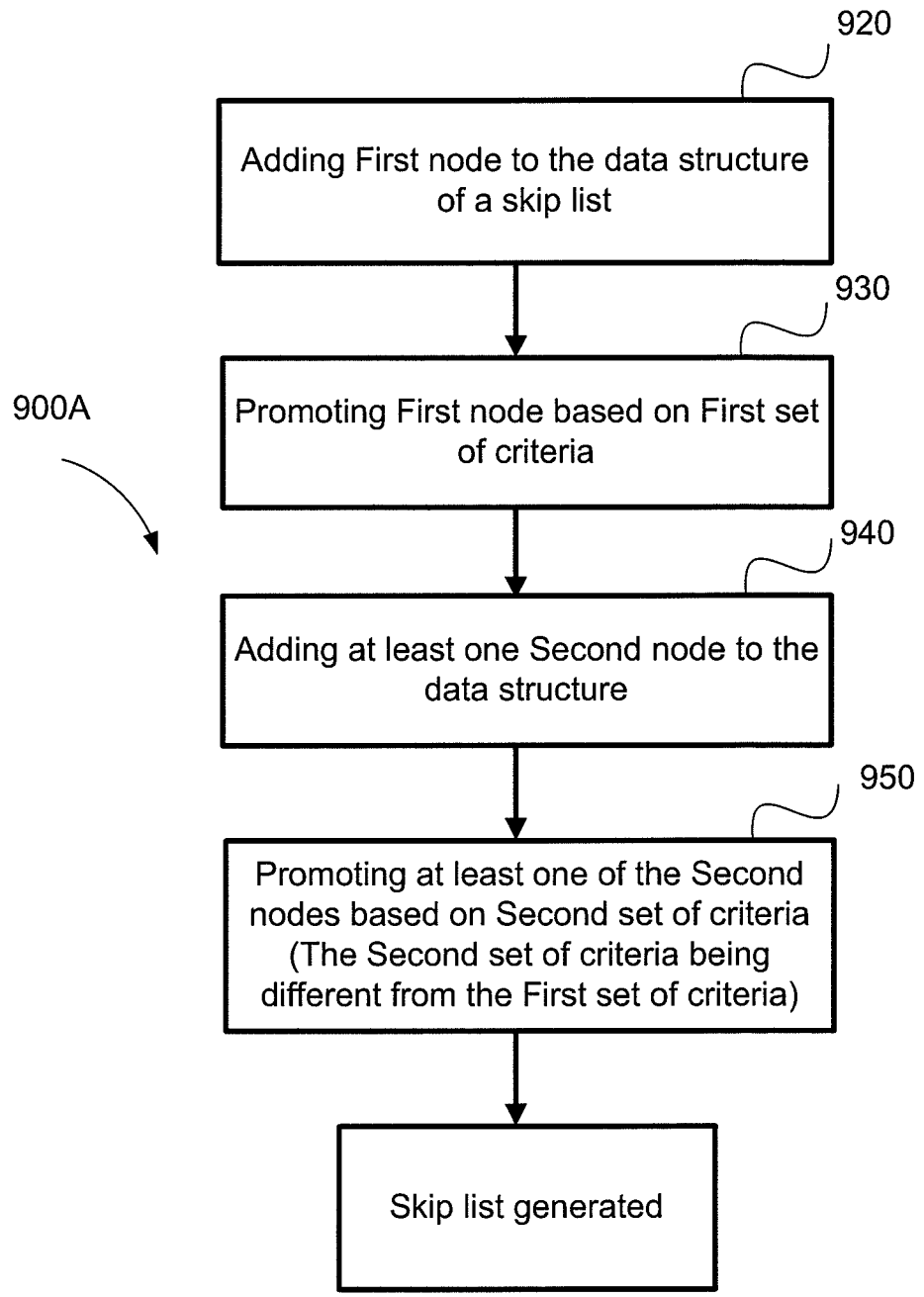
FIG. 9A is a schematic flow diagram of a method for skip list generation.
Figure 9B:
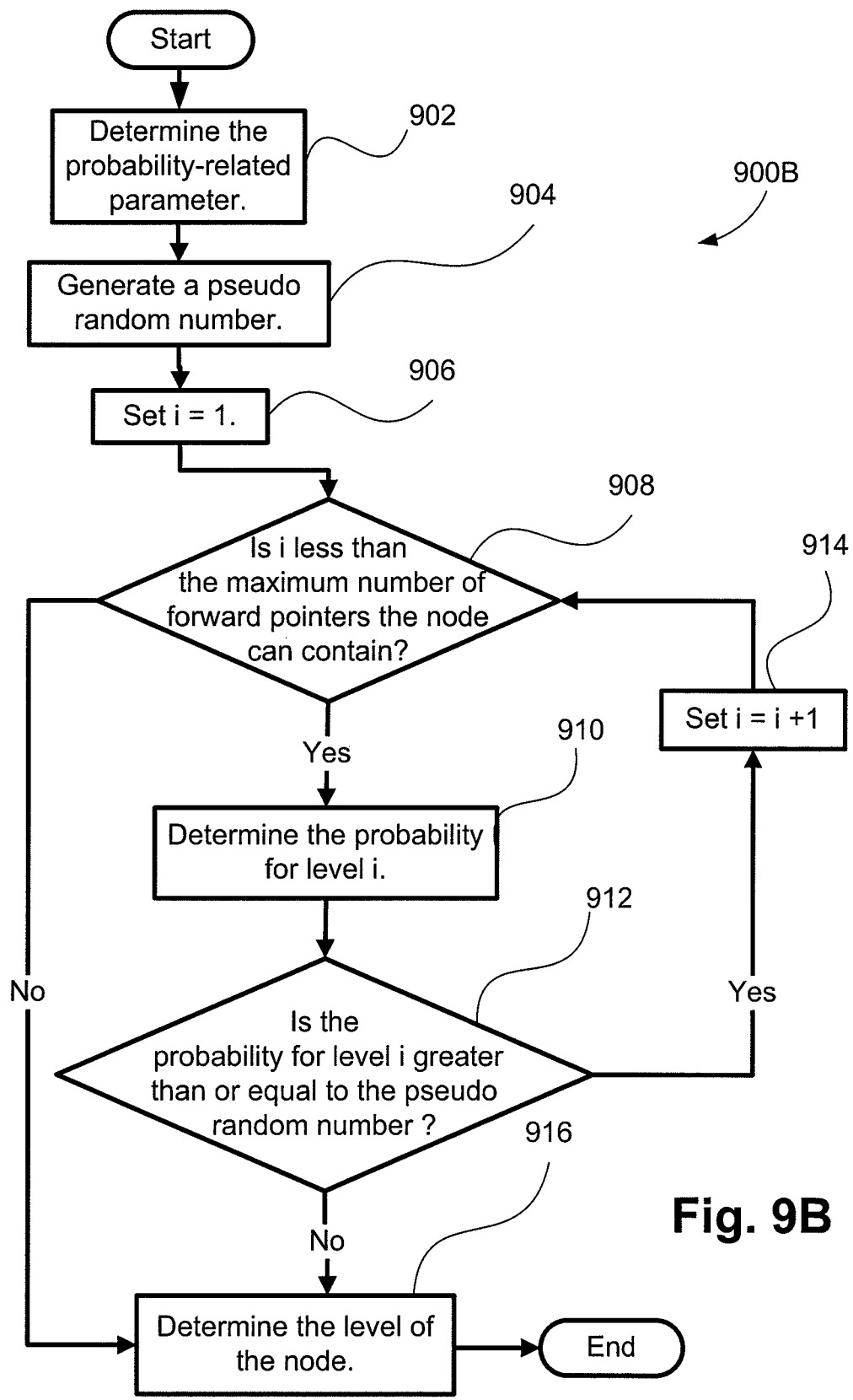
FIG. 9B is a schematic flow diagram of one embodiment of the described method utilising one set of criteria for promoting nodes to particular levels.

FIG. 8 is a flowchart showing the memory block release process in accordance with one implementation. The method 800 is preferably implemented as part of the operation of the memory allocator 2 and may be invoked when the application program 133 requests memory blocks to be allocated or released. In this regard, the method 800 may execute within the processor 105 of computer module 101.

The process of releasing a memory block begins at searching step 801, where the processor 105 operates to release a previously allocated block of memory to the allocator by the application program 133 for later re-use. The address-ordered list is searched to find the nearest free neighboring blocks that lie before and after the address of the block of memory being released. This search returns the nearest block with a lower address (nearest lowest block), if any, and the nearest block with a higher address (nearest higher block), if any. At a first checking step 803, the processor 105 carries out a check to determine if the block being released is contiguous with the nearest block with the higher address, if any.

If a block is contiguous with the nearest higher address block (Yes option of step 803), the process proceeds to a second checking step 805, where the processor 105 carries out a check to determine if the block being released is contiguous with the nearest lower address (the nearest lower block), if any.

If the block is contiguous with the nearest lower address block (Yes option of step 805), in coalescing step 807, the node representing the nearest lower block is removed, by processor 105, from both the size-ordered and the address-ordered lists. The node representing the nearest higher block is now associated with the combination of the block being released and its two neighboring blocks. These blocks are now coalesced. The address and size of the node are updated accordingly by the processor 105. As a result the node is removed from the size-ordered list and returned to the size-ordered list in the appropriate place according to the updated size of the node. It will be appreciated that the combined memory block will simply take the place of the nearest higher block on the address-ordered list since it retains the ordering of the original block with respect to its closest neighbors. The process 800 concludes.

Alternatively, if the block is not contiguous with the nearest lower address block, (No option of step 805), the process proceeds to a coalescing step 811. At this step 811, the node representing the nearest higher block is associated with the combination of the block being released and the nearest higher block. These blocks are now coalesced. The address and size of the node are updated accordingly. As a result, the processor 105 removes the released node from the size-ordered list and returns the node to the size-ordered list in the appropriate place according to the updated size of the node. The process concludes.

Returning now to step 803, if the block is not contiguous with the higher address block (No option of step 803) the process proceeds to step 809, where the processor 105 checks if the block being released is contiguous with the nearest lower block, if any.

If the block is contiguous with the nearest lower address block (yes option of step 809), in coalescing step 813 the node representing the nearest lower block is removed from the size-ordered lists by the processor 105. The node is then copied to the end of the released block and associated with the combination of the block being released and the nearest lower block. These blocks are now coalesced. The address and size of the node are updated accordingly by the processor 105. The node is then returned to the size-ordered list. The process concludes.

Alternatively, if the block is not contiguous with the nearest lower address block (no option of step 809), the process proceeds to memory reserving step 815, where some memory is reserved by the processor 105 at the end of the block being released for the new node. The size of the memory reserved depends on the size of the block being released. If the size of the block being released is larger than the maximum node size then the size of the reserved memory is the maximum node size. Otherwise the entire block of memory being released is reserved. The maximum level of the node is one less than the number of forward pointer structures that a node can contain and still fit within the reserved memory. It is to be appreciated that the maximum level will be between 3 (which is one less than the number of forward pointer structures in a node of minimum node size) and 7 (which is one less than the number of forward pointer structures in a node of maximum node size).

The process continues with a level determining step 817, in which the level of the newly released node (or, in other words, the highest skip list level the node will be promoted to) is determined. This step will be explained in more detail later in the text with reference to method 900B of FIG. 9.

Following step 817, the process 800 continues at node inserting step 819 in which the address and the size parameters of the node are updated according to the address and the size of the block being released, and the node is inserted into both the size-ordered and address-ordered skip lists. As part of the node inserting step 819, the processor 105 updates the free-list state information 3. In the state information 3, each count of the number of nodes having at least a given number of forward pointer structures, such as 25 and 27, is incremented by one if the node that was inserted into the free-list has at least that many forward pointer structures. The process 800 is thus concluded.

The result of the above discussed methods of memory allocation (method 700) and release (method 800) are illustrated in FIG. 5, showing the structure of the free list of FIG. 4 after a further block has been allocated, and the first allocation released. FIG. 6, formed by the combined representation of FIGS. 6A and 6B, shows the structure of the free list after many allocation/release requests, the structure comprising nodes of different levels.

In the prior art, each newly added node is promoted to a certain skip list level, within the newly generated skip list, on the basis of a fixed set of criteria. In a probabilistic-type of skip list, the fixed set of criteria is in the form of a fixed probability. According to the method disclosed in this specification, the promotion of at least some of the newly added nodes to a certain level is effected on the basis of a dynamically varied criterion or a set of criteria. An implementation of such a method 900A will now be described with reference to FIG. 9A. The method 900A may be construed both in the context of a newly generated skip list, as well as in the context of adding new nodes to an existing skip list and, thus, effectively generating a new skip list. The method 900A is especially efficient for managing free lists for the purpose of memory block managements. IN such case the skip list itself is often stored in the managed memory blocks. Because of that, the total number of linked lists of the skip list may be constrained by an available size of at least one of the memory blocks referenced by the skip list.

In particular, the method 900A comprises the step 920 in which the processor 105 adds a new node by inserting the node into the data structure associated with a skip list, which could be established or yet to be defined skip list. The processor 105 then uses a first set of criteria to, in step 930, promote the newly added node to a respective level of the skip list structure. As described in the text above, each level in a skip list represents an ordered linked list of nodes containing a subsequence of the nodes in the linked list of the level below. Step 930 is followed by step 940, in which the processor 105 adds one or more further nodes by inserting the one or more further nodes into the skip list data structure. The processor 105 then uses a second set of criteria to, in step 950, promote at least one of the newly added further nodes to a respective level of the skip list structure. The second set of criteria used in step 950 is different from the first set of criteria, used in step 930.

In an embodiment using a probabilistic-type of skip list, the set of criteria is in the form of a calculated probability. However, instead of in the form of a probability, the set of criteria may also be in the form of one or more rules, or a set of rules, as is known to be the case with deterministic skip lists.

Thus, in the discussed method 900A, with the addition of more modes to the original skip list, the probability (or other rules that may define the relevant criteria) for promoting nodes to specific levels for at least one node is different from that for the probability used to promote the remaining nodes. In a preferred embodiment, each time a node is added, a calculation is performed by the processor 105 to determine probability on which the promotion of the node in the newly formed skip list is based.

Several embodiments of the discussed method for the generation of a skip list will now be described with reference to the particular method of determining the respective probability, or other set of rules, for promoting the newly added node to a particular level.

Method 900B in FIG. 9 shows one method for determining the highest skip list level a node, that is to be inserted into an address-ordered and size-ordered skip list, will be promoted to. This level is also referred to as the level of the node. It will be appreciated that the number of forward pointer structures in the node minus one is equal to the level of the node. The method 900B is preferably executed by the processor 105 as part of the functionality of the memory allocator 2 and may be invoked when the application program 133 requests memory to be allocated or released within the computer module 101. 900B The method 900B begins with processor 105 calculating, at step 902, a probability-related parameter based on the number of nodes in the skip list plus one. Desirably, the parameter is determined by raising the number of nodes in the skip list, increased by one, to the power of the negative of the inverse of the maximum number of forward pointer structures that the node can contain, that is, $$p = (n_0 + 1)^{\frac{-1}{L}}.$$

Here p is the probability-related parameter that is being calculated, $n_0$ is the number of nodes having at least one forward pointer structure in the skip list 25, $n_0$ being obtained from the state information 3, and L is the maximum number of forward pointer structures that the node can contain. It has to be noted that the number forward pointer structures is limited by the number of linked lists (levels) in the skip list, which also constraints the maximum level of a node. The maximum number of forward pointer structures that the node can contain is limited by the memory reserved for the node in step 815. It is to be appreciated that the maximum number of forward pointer structures a node can contain imposes an upper bound on the level of a node, which is determined in method 900B.

In step 904 a pseudo random number is generated that is between zero and one. In a preferred embodiment this is achieved through the use of a pseudo random number generator. Those skilled in the art will be aware of numerous ways in which a pseudo random number may be generated and a pseudo random number generator may be implemented, either by the processor 105 or by a further processor, not shown.

In step 906 the variable i is set to 1. In step 908, the processor 105 compares i to the maximum number of forward pointer structures the node can contain. If i is smaller than the maximum number of forward pointer structures the node can contain (the Yes option of step 908) then the process continues at step 910.

At step 910 the processor 105 calculates a parameter $\lambda_i$ for level i, being a parameter from which the probability of promoting a level can be derived. The parameter $\lambda_i$ is typically a probability having a value in the range [0,1], and nothing further need be derived. However in some implementations of the evaluation of $\lambda_i$, to be described, the value of $\lambda_i$ may exceed the range [0,1], in which cases $\lambda_i$ may also be considered a probability-related parameter. Where such occurs, this further probability-related parameter may be clamped to the range [0,1] so as to derive a probability value. Appreciating this qualification, $\lambda_i$ will hereafter be referred to as simply a 'probability'.

The probability $\lambda_i$ for a node being promoted to the level i is determined by first raising the probability-related parameter determined in step 902 to the power of i, multiplying this by the number of nodes in the skip list, plus one, and then subtracting from this the number of nodes with a level greater than, or equal to, i in the skip list, that is, $$\lambda_i = p^i(n_0+1) - n_i$$

Here $\lambda_i$ is the probability for the node being promoted to level i, p is the probability-related parameter determined in step 902, $n_0$ is the number of nodes in the skip list and $n_i$ is the number of nodes with a level greater than or equal to i in the skip list. The numbers $n_0$ and $n_i$ are obtained from the state information 3.

In step 912, the processor 105 compares the probability $\lambda_i$ determined at step 910 against the pseudo random number generated in step 904. It is to be appreciated that the pseudo random number generated at step 904 has a fine enough granularity to accommodate the comparison of step 912, in particular when the probability $\lambda_i$ is extremely small. If the probability $\lambda_i$ is greater than, or equal to, the pseudo random number (yes option of step 912) then the processor 105 executes the process 900B to continue to step 914, in which i is incremented and the process returns to step 908.

If the probability $\lambda_i$ is smaller than the pseudo random number (no option of step 912) then the process is continued to step 916.

Alternatively if i is equal to the maximum number of forward pointer structures the node can contain (no option of step 908) then the process continues to step 916.

In step 916 the processor 105 calculates the level of the node to be i minus 1 and the method 900B is terminated.

Thus, the method 900B of determining the level of a node dynamically adapts the probability used to determine the level to which a newly added node is promoted. As a result, different parameter p and probability $\lambda_i$ are used for each new node. This dynamic variation results in a search performance that is superior to that of a conventional skip list, when the number of nodes is relatively large. This is shown in the graph plotted in FIG. 11.

Figure 11:
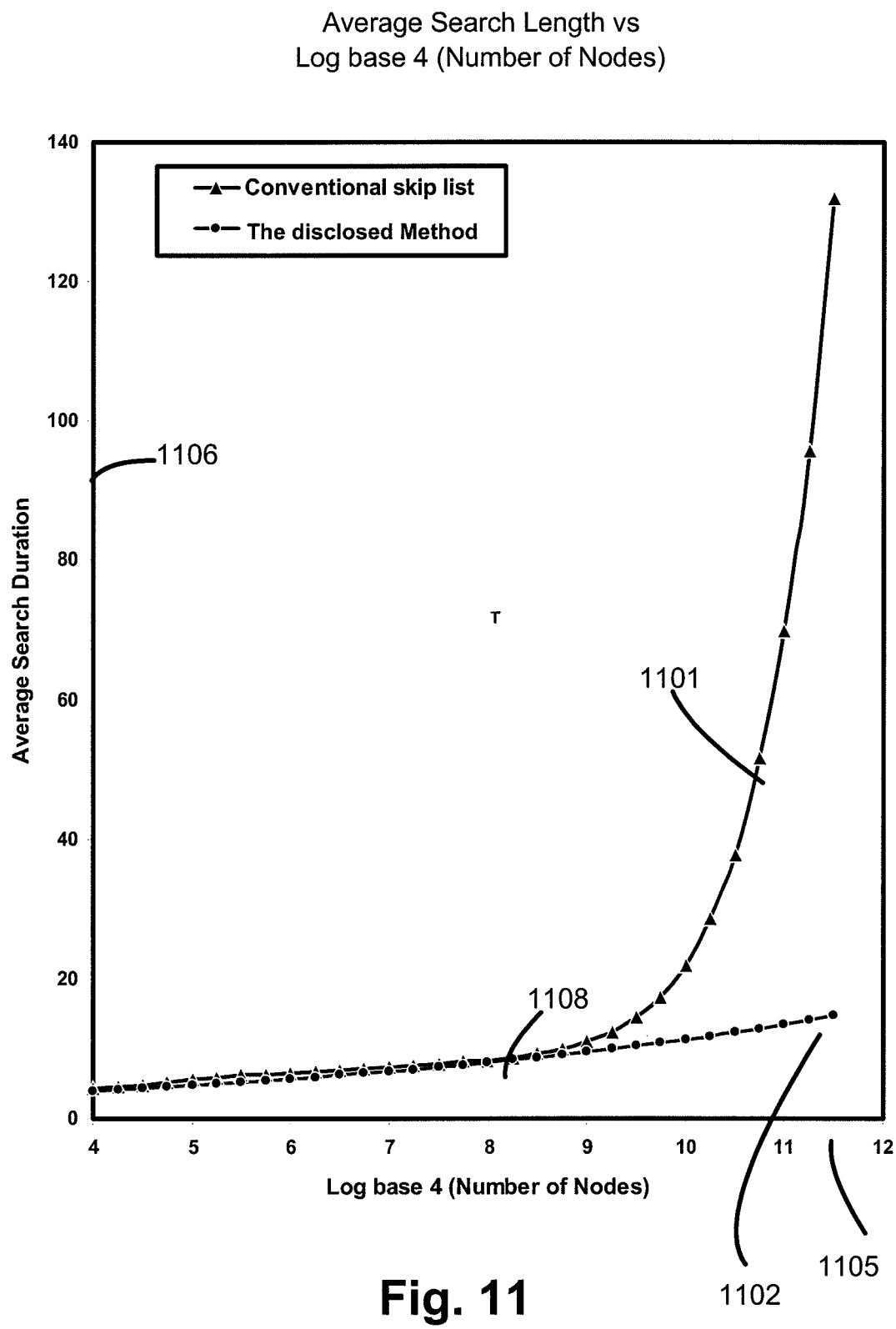
FIG. 11 is a plot of the average search duration for a skip list, generated by one embodiment of the described method, as well as for a conventional skip list, against the log base 4 of the number of nodes in the skip list.

In particular, FIG. 11 shows plots of the average search length 1106 against the log base 4 of the number of nodes 1105 in the searched skip list, for a skip list implementation according to the above described embodiment (graph 1102) and a conventional skip list (graph 1101). The average search length 1106 is the average number of nodes in the skip list that needs to be visited in a search operation. The conventional skip list represented by graph 1101 uses a fixed probability of 0.25. In this test all nodes can hold a maximum of 8 forward pointer structures. As can be seen in FIG. 11, the performance of a conventional skip list begins to degrade drastically once the number of nodes in the skip list has exceeded approximately 65536 nodes, which is marked on the graph by a point 1108. This performance degradation is a standard limitation of conventional skip lists. The skip list structure implemented according to the described embodiment has no such limitation due to the probability used for determining the level of a node being dynamically adapted to efficiently support the respective number of nodes.

This difference between the performance of the conventional skip list and the discussed skip list implemented according to the above discussed embodiment is confirmed by conducted experiments with performing graphics operations including the memory allocator 2. Such experiments have shown that, when using a conventional skip list, the execution time spent by the methods of FIGS. 7 to 9 was on average 25% of the total time spent for the particular graphics operation. By using the skip list structure implemented according to the described embodiment, the time spent in the methods of FIGS. 7 to 9 was reduced to less than 1% of the total time spent for graphics operation, resulting in acceptable speed performance for the application program 133 to perform graphics operations.

In an alternative method to method 900B, steps 902 and 910 of the method 900B, used to determine the level of a node that is to be inserted into the address-ordered and size-ordered skip lists at the level determining step 817, are modified as follows.

In this first alternative method, at the parameter-determining step 902, the processor 105 determines not only the probability-related parameter p, but also an additional parameter q. The additional parameter q is calculated by raising the number of nodes in the skip list to the power of the negative of the inverse of the maximum number of forward pointer structures that a node can contain, that is, $$q = (n_0)^{\frac{-1}{L}}.$$

Here q is the additional parameter that is being calculated, $n_0$ is the number of nodes having at least one forward pointer structure in the skip list 25, $n_0$ being obtained from the state information 3, and L is the maximum number of forward pointer structures that the node can contain.

In this first alternative method, step 910 determines the probability $\lambda_i$ for level i by multiplying the number of nodes in the skip list, plus one, by the probability-related parameter p raised to the power of i, p being determined in step 902, and then subtracting from this the number of nodes in the skip list multiplied by the additional parameter q raised to the power of f, q being determined in step 902, that is, $$\lambda_i = p^i(n_0+1) - q^i n_0.$$

Here $\lambda_i$ is the probability for the node being promoted to level i, p and q are respectively the probability-related parameter and the additional parameter calculated in the modified parameter determining step 902 and $n_0$ is the number of nodes in the skip list, which is also the number of nodes in the skip list with at least one forward pointer structure.

It is to be appreciated that in this first alternative embodiment only the count of the number of nodes having at least one forward pointer structure 25 is needed from the state information 3 associated with the free-list 8. As a result, updating step 713 of method 700 and node inserting step 819 of method 800 can be modified, for the insertion of each new node, to only update the count of the number of nodes having at least one forward pointer structure 25 from the state information 3. This optimisation may improve the method's efficiency by avoiding unnecessary calculations.

In a second alternative method, steps 902 and 910 of the method 900B, used to determine the level of a node that is to be inserted into the address-ordered and size-ordered skip lists at step 817, are modified as follows.

In this second alternative method to the method 900B, the step 902 does not determine the probability-related parameter p. Instead, step 910 determines the probability $\lambda_i$ by dividing the maximum number of forward pointer structures the node can contain by the maximum number of forward pointer structures in the skip list header 10 and then multiplying this by a fixed predetermined probability raised to the power i, that is:

$$\lambda_i = \frac{L_N}{L_{max}} p_{fixed}^i.$$

Here $\lambda_i$ is the probability for a node to be promoted to the level i, $p_{fixed}$ is the predetermined fixed skip list probability, $L_N$ is the maximum number of forward pointer structures that the node can contain and $L_{max}$ is the maximum number of forward pointer structures that the skip list header 10 can contain. In this second alternative that was presented, the predetermined fixed skip list probability $p_{fixed}$ is 0.25. It is to be appreciated that $p_{fixed}$ can be chosen in a number of ways including for example chosen such that it is suitable for the expected maximum number of nodes. In the embodiment that was presented, the maximum number of forward pointer structures, $L_{max}$, is eight.

It is to be appreciated that in this second alternative method there is no need to maintain and update the state information 3 associated with the free-list 8. As a result, the relevant updates performed in steps 713 and 819 are no longer necessary, which avoids unnecessary calculations.

Figure 10:
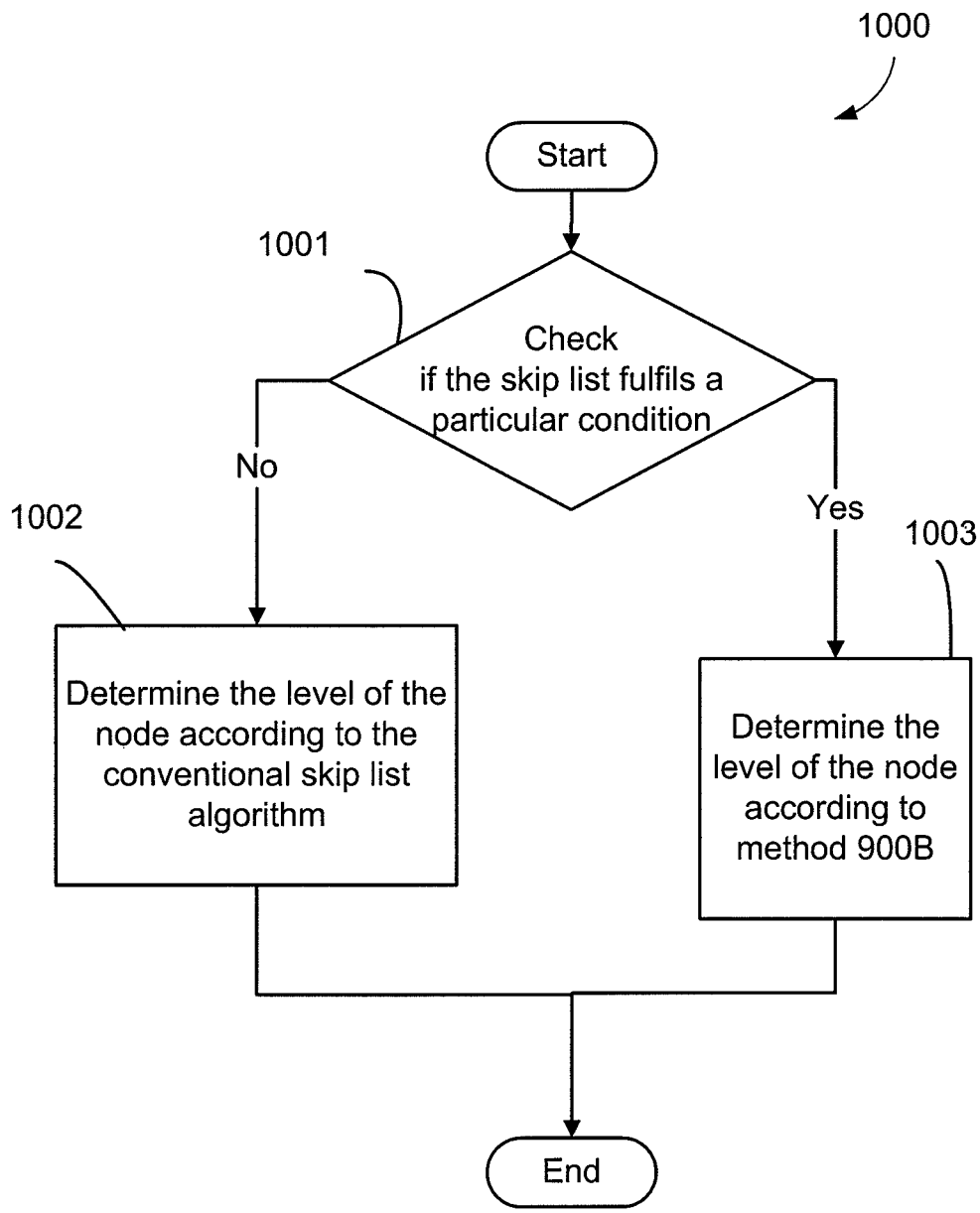
FIG. 10 is a schematic flow diagram of a second embodiment of the described method utilising another set of criteria for promoting nodes to particular levels.

In a third alternative method to the method 900B, the step 817 is determined according to method 1000 of FIG. 10. The method 1000 is preferably implemented as part of the memory allocator 2 and is invoked by the processor 105 when the application program 133 requests memory to be allocated or released.

Method 1000 begins at the checking step 1001, where the processor 105 checks if the skip lists fulfills a particular condition. In the particular example shown in FIG. 10, the condition relates to whether the number of nodes in the skip list is greater than a probability $p_0$ raised to the power of the negative of the maximum number of forward pointer structures that the node can contain, that is:

$$n_0 > (p_0)^{-L}$$

Here $p_0$ has the predetermined fixed value of 0.25, $n_0$ is the number of nodes having at least one forward pointer structure in the skip list and is obtained from the state information 3, and L is the maximum number of forward pointer structures that the node can contain. The predetermined fixed value $p_0$ is a probability value which is used at step 1002 in a conventional skip list. $p_0$ is chosen according to methods well known in the art.

If the number of nodes in the skip list is greater than the probability $p_0$ raised to the power of the negative of the maximum number of forward pointer structures that the node can contain, then the process proceeds to step 1003. At step 1003, the processor 105 calculates the level the node will have, according to method 900B of the preferred embodiment described with reference to FIG. 9.

If the number of nodes in the skip list is smaller than or equal to the probability $p_0$ raised to the power of the negative of the maximum number of forward pointer structures that the node can contain, then the process proceeds to step 1002. At step 1002, the level of the node is determined according to a conventional skip list implementation, using the probability $p_0$.

In a fourth alternative embodiment, step 910 of the method 900B, used to determine the level of a node that is to be inserted into the address-ordered and size-ordered skip lists at level determining step 817, is modified as follows.

In this fourth alternative embodiment, step 910 determines the probability $\lambda_i$ by raising the probability-related parameter p calculated in step 902 to the power of i, that is:

$$\lambda_i = p^i$$

Here $\lambda_i$ is the probability that is being determined and p is the probability-related parameter calculated at step 902.

It is to be appreciated that in this fourth alternative embodiment there is no need to maintain and update the state information 3 associated with the free-list 8. As a result, updating step 713 of method 700 and node inserting step 819 of method 800 can be modified to not update the state information 3 and avoid unnecessary calculations.

Figure 12:
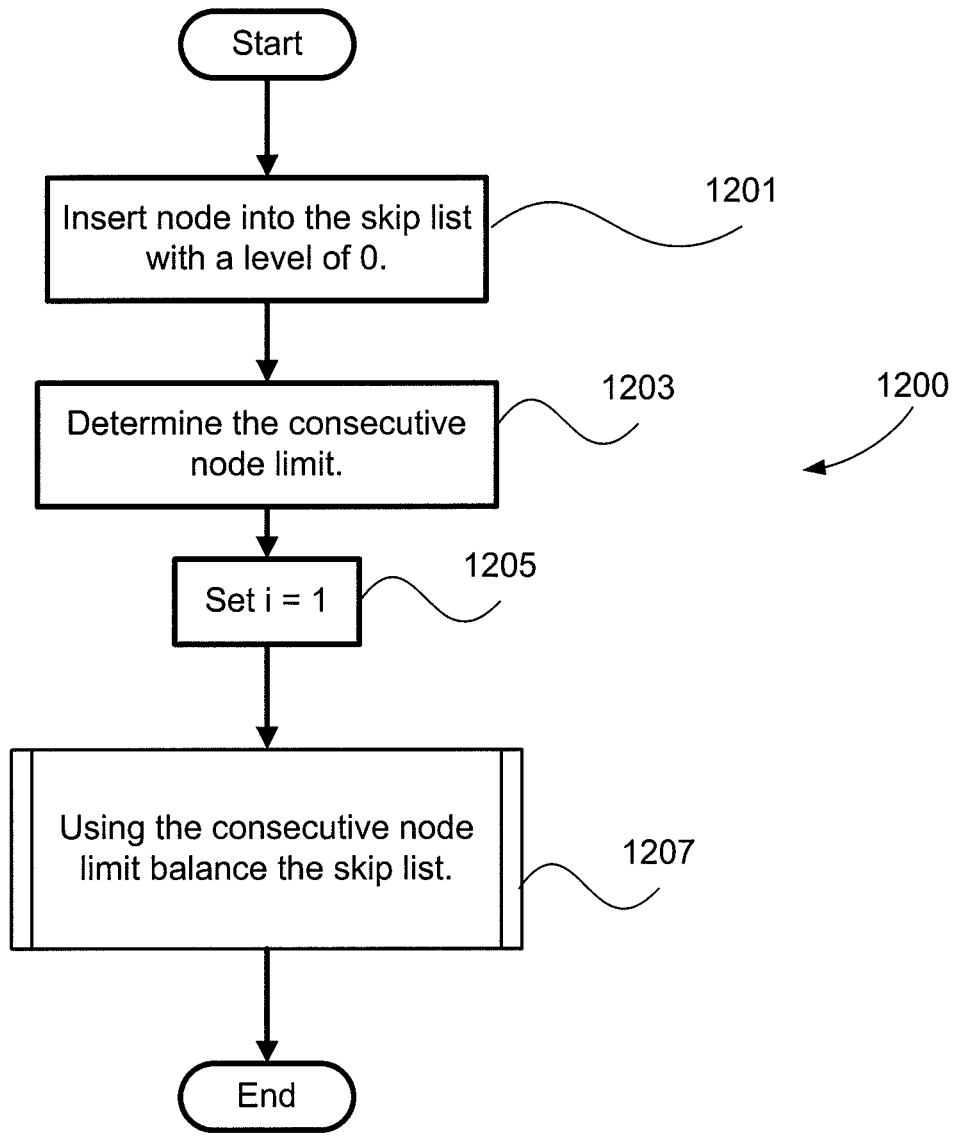
FIG. 12 is a schematic flow diagram of a further embodiment of the described method utilising a further set of criteria for promoting nodes to particular levels.
Figure 13:
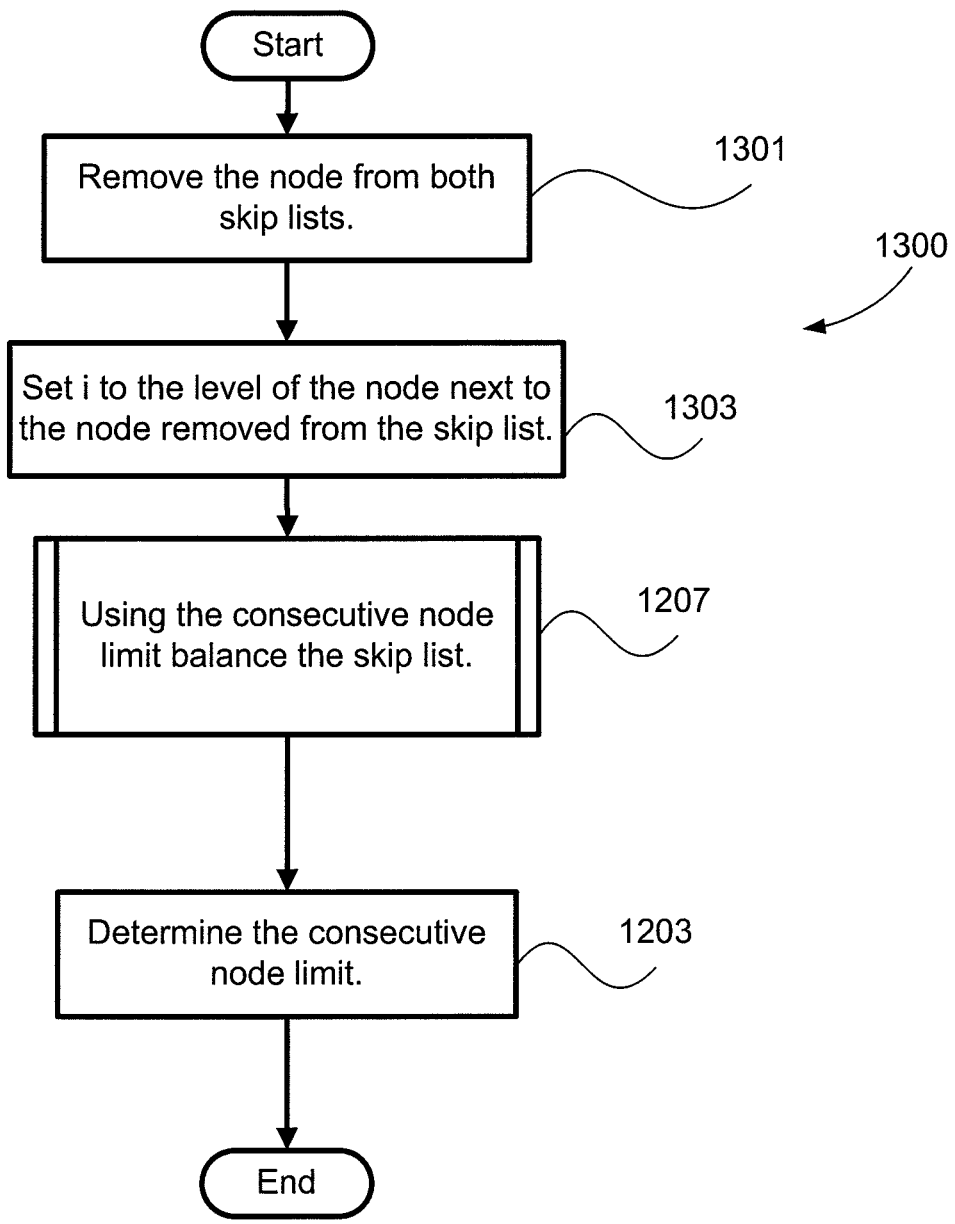
FIG. 13 is a schematic flow diagram illustrating a method of removing a node from a skip list.

In a fifth alternative embodiment, steps 817 and 819 of method 800 are replaced by method 1200 of FIG. 12, and step 711 of method 700 is replaced by method 1300 of FIG. 13. In this alternative embodiment the insertion and removal of nodes is performed in a manner similar to a deterministic skip list.

The method 1200 is preferably implemented by the processor 105 as part of the functionality of the memory allocator 2 and may be invoked when the application program 133 requests memory to be allocated or released.

In insertion step 1201, the node is inserted into the address ordered and size ordered skip lists with a level of zero. The state information 3 is updated to reflect the number of nodes in the address ordered skip list. The process then continues at step 1203 where the consecutive node limit q is determined. Generally, the consecutive node limit is the maximum allowed number of nodes, which are consecutively adjacent at the zero level and which have the same level (the highest skip list level to which each node is promoted to). It has to be noted that all of the adjacent nodes are consecutive to each other and are adjacent at the zero level, such that if a node is between two nodes, it has to be adjacent to both nodes. The consecutive node limit in this case is calculated by the processor 105 taking the ceiling (closest integer larger or equal to this number) of the number of nodes in the address ordered skip list raised to the power of the inverse of the maximum number of forward pointer structures a node can contain, that is, $$q = \text{ceil}\left((n_0)^{\frac{1}{L}}\right)$$

Here q is the consecutive node limit that is being calculated, $n_0$ is the number of nodes having at least one forward pointer structure in the skip list 25, and is obtained from the state information 3, and L is the maximum number of forward pointer structures that the node can contain.

Also as part of step 1203, the processor 105 stores the consecutive node limit in the state information 3.

The process continues at step 1205 where i is set to 1. At step 1207, the processor 105 uses the consecutive node limit calculated in step 1203 to balance the skip list as described in method 1400 of FIG. 14. Following this the process ends.

FIG. 13 is a schematic flow diagram of a method 1300 of removing a node from a skip list. The method 1300 is preferably implemented by the processor 105 as part of the functionality of the memory allocator 2 and may be invoked when the application program 133 requests memory to be allocated or released.

In removal step 1301, the node is removed from both the address ordered and size ordered skip lists.

The process then continues at step 1303 where the processor 105 sets i to the level of the node in the address ordered skip list immediately before the node that was removed from the skip lists in step 1301. If there is no immediately prior node in the address ordered skip list (that is, the header node precedes the node that was removed), then i is set to one.

At step 1207, the skip list is balanced by the processor 105 using the consecutive node limit stored in the state information 3 according to method 1400. The process of substantially balancing the skip list may re-arrange nodes within the skip list to help maintain good skip list performance. In this embodiment, the process of substantially balancing the skip list consists of ensuring that nodes, which are consecutively adjacent at the zero level and which have the same level, do not exceed the predetermined consecutive node limit. This predetermined value is usually decided on the basis of the total number of nodes to be included in the skip list, as explained in step 1203. The process continues at step 1203 where the processor 105 determines the consecutive node limit and stores it in the state information 3. The process then ends.

Figure 14:
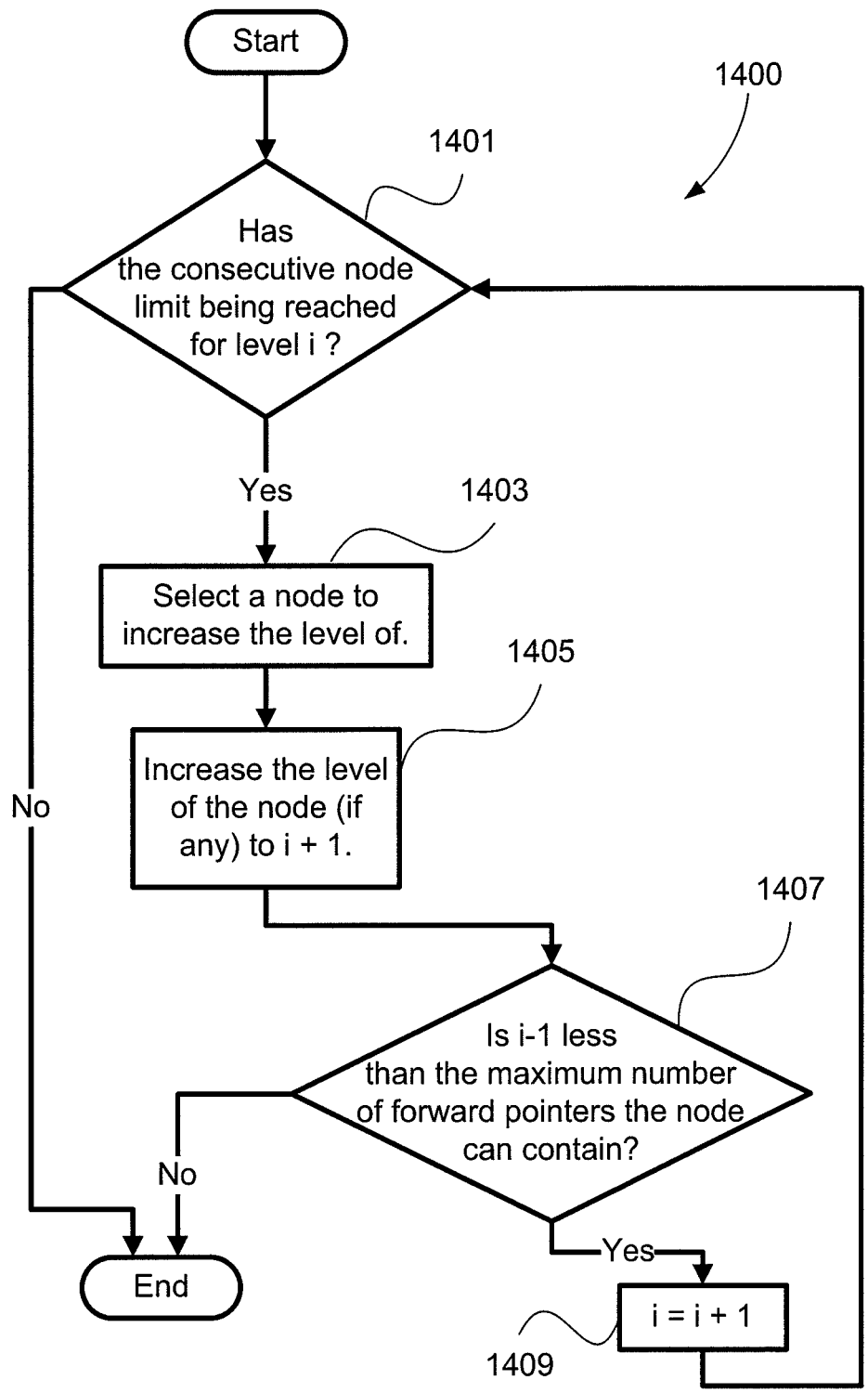
FIG. 14 is a schematic flow diagram illustrating a method of balancing a skip list.

FIG. 14 shows a method 1400 for balancing a skip list. The method 1400 is preferably implemented by the processor 105 as part of the functionality of the memory allocator 2 and may be invoked when the application program 133 requests memory to be allocated or released.

At step 1401, the processor 105 checks if the predetermined consecutive node limit has been reached for the i-th level. If the maximum number of consecutive nodes in the address ordered skip list with level i is greater than or equal to the consecutive node limit (yes option of step 1401) then the process continues at step 1403.

In step 1403 the processor 105 selects the node closest to the middle of the set of consecutive nodes in step 1401 to have its level increased. If due to a memory restriction imposed by the size of the node it is not possible to increase the level of the node closest to the middle of the set of consecutive nodes, then the next node nearest to the middle of the set of consecutive nodes is selected. This process continues until a node is selected that is able to have its level increased, or until all nodes in the set of consecutive nodes have been checked.

The process continues in step 1405 where the processor 105 increases the level of the node selected in step 1403, if any, to i+1. This is achieved by removing the selected node from the skip lists and then reinserting the node with level i+1.

In step 1407 a check is made to see if i−1 is less than the maximum number of forward pointer structures a node can contain. If i−1 is less than the maximum number of forward pointer structures a node can contain (yes option of step 1407) then the process continues at step 1409, in which the processor 105 sets i to i+1 and the process returns to step 1401.

If in step 1407, i−1 is greater than or equal to the maximum number of forward pointer structures the node can contain (no option to step 1407) then the process ends.

If in step 1401, the maximum number of consecutive nodes in the address ordered skip list with level i is less than the consecutive node limit (no option of step 1401) then the process also ends.

It is to be appreciated that in this fifth alternative embodiment only the count of the number of nodes having at least one forward pointer structure 25 is needed from the state information 3 associated with the free-list 8. As a result, updating step 713 of method 700 can be modified to only update the count of the number of nodes having at least one forward pointer structure 25 from the state information 3. This optimisation will avoid unnecessary calculations.

The deterministic skip list rules can be determined in a number of alternative ways. Such ways include deterministic skip list rules that emulate a conventional probability-based skip list. For example, a consecutive node limit of 4 in a deterministic skip list emulates a conventional probability-based skip list which uses a probability of 0.25. As a consequence, the methods 900B and 1000, as described with reference to FIGS. 9B and 10, can be emulated using a deterministic skip list in a manner similar to methods 1200, 1300 and 1400, as described with reference to FIGS. 12, 13 and 14, respectively.

In one example, the deterministic skip list rules may be based on the current number of nodes, and the number of linked lists in the skip list. In another example, the deterministic skip list rules are based on the size of the memory block associated with a node being added or removed and the total number of linked lists in the skip list.

The foregoing describes only one embodiment/some embodiments of the present invention, and modifications and/or changes can be made thereto without departing from the scope and spirit of the invention, the embodiment(s) being illustrative and not restrictive.

INDUSTRIAL APPLICABILITY

The arrangements described are applicable to the computer, data processing and any other industries utilising free list and skip lists structures for allocation of memory data blocks or, more generally, to any form of program in which an associative array data structure is used to reference data.

We claim:

1. A computer-implemented method of generating a skip list, the skip list comprising a data structure for referencing a plurality of nodes, the data structure having a plurality of linked lists, the method comprising the steps of:
    inserting a first node and a second node of the plurality of nodes into a first linked list of the plurality of linked lists of the data structure of the skip list;
    promoting the first node from the first linked list to a second linked list based on a first probability value;
    determining a second probability value for promoting the second node from the first linked list to the second linked list, the determined second probability value being different from the first probability value; and
    generating the skip list by promoting the second node from the first linked list to the second linked list based on the determined second probability value.

2. A method according to claim 1, wherein each of the first and the second probability values are determined based on a total number of the nodes in the skip list and the maximum number of linked lists that the respective node can be added to.

3. A method according to claim 2, wherein the determination of each of the first and the second probability values is effected on the basis of a condition associated with the number of nodes in the skip list having at least one forward pointer structure, the maximum number of linked lists that the respective node can be added to and a predetermined probability value.

4. A method according to claim 2, wherein each of the first and the second probability values are further determined on the basis of a number of nodes in a linked list that the respective node is added to.

5. A method according to claim 1, wherein each of the first and the second probability values are determined based on the maximum number of linked lists that the respective node can be added to, the maximum number of linked lists in the skip list header and a predetermined fixed probability value.

6. A method according to claim 1, wherein the first linked list contains all of the nodes in the skip list.

7. A computer-implemented method of generating a skip list, the skip list comprising a data structure for referencing a plurality of nodes, the data structure having a plurality of linked lists, the method comprising the steps of:
    inserting a first node and a second node of the plurality of nodes into a first linked list of the plurality of linked lists of the data structure of the skip list;
    promoting the first node from the first linked list to a second linked list based on a first set of deterministic skip list rules;
    obtaining a second set of deterministic skip list rules for promoting the second node from the first linked list to the second lined list, the second set of deterministic skip list rules being different from the first set of deterministic skip list rules; and
    generating the skip list by promoting the second node from the first linked list to the second linked list based on the second set of deterministic skip list rules.

8. A method according to claim 7, wherein each of the first and the second set of deterministic skip list rules is determined based on a consecutive node limit and the maximum number of linked lists that the respective node can be added to.

9. A method according to claim 7, wherein each of the first and the second set of deterministic skip list rules is determined based on a total number of nodes on one or more linked lists of the skip list and the total number of linked lists in the skip list.

10. A method according to claim 7, wherein each of the first and the second set of deterministic skip list rules is determined based on both a size of the memory block, the associated node of which is to be promoted and the total number of linked lists in the skip list.

11. A method according to claim 7, wherein the first and second deterministic skip list rules include limiting the number of consecutive nodes in the skip list within the same linked list.

12. A computer implemented method for generating a skip list, the skip list comprising a data structure including a plurality of nodes for referencing a plurality of respective memory blocks, the data structure comprising a plurality of linked lists, each node referencing at least one respective memory block and at least one of the remaining nodes, each node being included in one or more of the linked lists and being stored in the respective memory block referenced by the node so that a total number of the plurality of linked lists is constrained by an available size of at least one of the memory blocks, the method comprising the steps of:
   inserting a first node referencing a first memory block of the plurality of memory blocks into a predetermined linked list of the plurality of linked lists of the data structure;
   promoting the first node to one or more other linked lists based on a first probability value;
   inserting at least one second node, referencing at least one second respective memory block of the plurality of memory blocks into the predetermined linked list of the data structure; and
   generating the skip list by promoting at least one of the at least one second node to said one or more other linked lists based on at least one second probability value, wherein at least one of the at least one second probability values is different from the first probability value.

13. A computer implemented method of generating a skip list, the skip list comprising a data structure including a plurality of nodes for referencing a plurality or respective memory blocks, the data structure comprising a plurality of linked lists, each node referencing at least one respective memory block and at least one of the remaining nodes, each node being included in one or more of the linked lists and being stored in the respective memory block referenced by the node, the method comprising the steps of:
   inserting a first node and a second node referencing a first memory block of the plurality of memory blocks into a first linked list of the plurality of linked lists of the data structure;
   promoting the first node from the first linked list to a second linked list based on a first set of deterministic skip list rules;
   obtaining a second set of deterministic skip list rules for promoting the second node from the first linked list to the second linked list, the second set of deterministic skip list rules being different from the first set of deterministic skip list rules; and
   generating the skip list by promoting the second node from the first linked list to the second linked list based on the second set of deterministic skip list rules.

14. A method of generating a skip list, the skip list comprising a data structure for referencing a plurality of nodes, the data structure having a plurality of linked lists, the method comprising the steps of:
   inserting a first node and a second node of the plurality of nodes into a first linked list of the plurality of linked lists of the data structure of the skip list;
   promoting the first node from the first linked list to a second linked list based on a first set of criteria;
   obtaining a second set of criteria for promoting the second node from the first linked list to the second linked list, the second set of criteria being different from the first set of criteria; and
   generating the skip list by promoting the second node from the first linked list to the second linked list based on the second set of criteria.

15. A non-transitory computer readable storage device having recorded thereon a computer program for generating a skip list, the skip list comprising a data structure for referencing a plurality of nodes, the data structure having a plurality of linked lists, the program comprising:
   code for inserting a first node and a second node of the plurality of nodes into a first linked list of the plurality of linked lists of the data structure of the skip list;
   code for promoting the first node from the first linked list to a second linked list based on a first probability value;
   code for determining a second probability value for promoting the second node from the first linked list to the second linked list, the determined second probability value being different from the first probability value; and
   code for generating the skip list by promoting the second node from the first linked list to the second linked list based on the determined second probability value.

16. An apparatus for generating a skip list, the skip list comprising a data structure for referencing a plurality of nodes, the data structure having a plurality of linked lists, the apparatus comprising:
   inserting means for inserting a first node and a second node of the plurality of nodes into a first linked list of the plurality of linked lists of the data structure of the skip list;
   promoting means for promoting the first node from the first linked list to a second linked list based on a first probability value;
   determining means for determining a second probability value for promoting the second node from the first linked list to the second linked list, the determined second probability value being different from the first probability value; and
   generating means for generating the skip list by promoting the second node from the first linked list to the second linked list based on the determined second probability value.

* * * * *